United States Patent [19]

Schuler et al.

[11] Patent Number: 5,552,787
[45] Date of Patent: Sep. 3, 1996

[54] MEASUREMENT OF TOPOGRAPHY USING POLARIMETRIC SYNTHETIC APERTURE RADAR (SAR)

[75] Inventors: Dale L. Schuler, Fairfax Station; Jong-Sen Lee, Great Falls, both of Va.

[73] Assignee: The United States of America as represented by the Secretary of the Navy, Washington, D.C.

[21] Appl. No.: 541,392

[22] Filed: Oct. 10, 1995

[51] Int. Cl.$^6$ ...................................................... G01S 13/90
[52] U.S. Cl. .............................. 342/25; 342/188; 342/191
[58] Field of Search ............................ 342/25, 188, 190, 342/191, 192, 193, 194, 197, 65

[56] References Cited

U.S. PATENT DOCUMENTS

| | | | |
|---|---|---|---|
| 4,551,724 | 11/1985 | Goldstein et al. | 343/5 |
| 4,922,254 | 5/1990 | Schuessler et al. | 342/25 |
| 4,975,704 | 12/1990 | Gabriel et al. | 342/25 |
| 5,053,778 | 10/1991 | Imhoff | 342/191 |
| 5,142,291 | 8/1992 | Chang et al. | 342/424 |
| 5,313,210 | 5/1994 | Gail | 342/25 |

OTHER PUBLICATIONS

Madsen et al., "Analysis and Evaluation of the NASA/JPL TOPSAR Across-Track Interferometric SAR System", IEEE Trans. Geosc. and Remote Sensing, vol. 33, No. 4, pp. 383–391, Mar. 1995.

Rodriguez et al., "Theory and Design of Interferometric Synthetic Aperture Radars", IEEE Proceedings-F, vol. 139, No. 2, pp. 147–159, Apr., 1992.

Li et al., "Studies of Multibaseline Spaceborne Interferometric Synthetic Aperture Radars", IEEE Trans. Geosc. and Remote Sensing, vol. 28, No. 1, pp. 88–97, Jan., 1990.

Valenzuela, "Scattering of Electromagnetic Waves From a Tilted Slightly Rough Surface", Radio Science, vol. 3, No. 11, pp. 1057–1066, Nov., 1968.

Schuler, et al., "A Microwave Technique to Improve the Measurement of Directional Ocean Wave Spectra", Int. J. Remote Sensing, vol.16, No. 2, pp. 199–215, 1995.

Durden et al., "Modeling and Observation of the Radar Polarization Signature of Forested Areas",IEEE Trans. Geosc. and Remote Sensing, vol. 27, No. 3, pp. 290–301, May 1989.

van Zyl et al., "Imaging radar polarization signatures: Theory and Observation", Radio Science, vol. 22, No. 4, pp. 529–543, Jul.–Aug. 1987.

Ioannadis et al., "Optimum Antenna Polarizations for Target Discrimination in Clutter",IEEE Trans. Antennas and Propagation, vol. AP–27, No. 3, pp. 357–363, May 1979.

A. E. Bryjon et al., Applied Optimal Control, Ch. 1, Blasdell Publication Company, Waltham, MA, Toronto, Ont. Canada.

(List continued on next page.)

*Primary Examiner*—John B. Sotomayor
*Attorney, Agent, or Firm*—Thomas E. McDonnell; Charles J. Stockstill

[57] ABSTRACT

The polarimetric technique of measuring azimuth direction terrain slopes utilizes a polarimetric synthetic aperture radar (SAR) to provide a direct measure of terrain azimuthal slopes and a derived estimate of terrain elevation. Utilizing this measure of the azimuthal slopes and estimated terrain elevations, a one-dimensional terrain slope map over a wide area may be produced without any prior knowledge of the terrain. Utilizing the method of steepest descent (or gradients) the polarimetric orientation of the peak (maximum) of the signature is determined for each image pixel. The terrain elevations are derived by integrating the slopes in the azimuthal direction and may be further refined so as to obtain absolute, rather than relative, elevation values by independently knowing at least one elevation "tie-point" along each slope profile being integrated. These orientations are proportional to terrain slope in the azimuthal direction. Processing of all the image pixels allows a complete two-dimensional topography elevation map of the terrain slopes can then be constructed from sets of elevation profiles spaced throughout the range direction.

5 Claims, 18 Drawing Sheets

OTHER PUBLICATIONS

Kirk, "Optimal Control Theory an Introduction", Prentice-Hall, Englewood Cliffs, NJ, pp. 331–342, 1970.

van Zyl, "Unsupervised Classification of Scattering Behavior Using Radar Polarimetry Data", IEEE Trans. Geosc. and Remote Sensing, vol. 27, No. 1, pp.36–45, Jan. 1989.

Schuler, et al., "Polarimetric SAR Image Signatures of the Ocean and Gulf Stream Features", IEEE Trans. on Geosc. and Remote Sensing, vol. 31, No. 6, pp. 1210–1221, Nov. 1993.

van Zyl, "The Effect of Topography on Radar Scattering from Vegetated Areas", IEEE Trans. on Geosc. and Remote Sensing, vol. 31, No. 1, pp. 153–160, Jan 1993.

Doug et al., "Studies of the Cylinder–Ground Double Bounce Scattering Mechanism in Forest Backscatter Models", IEEE Trans. on Geosc. and Remote Sensing, vol. 33, No. 1, pp. 229–231, Jan 1995.

Madsen et al., "Topographic Mapping Using Radar Interferometry: Processing Techniques", IEEE Trans. on Geosc. and Remote Sensing, vol. 31, No. 1, pp. 246–255, Jan. 1993.

Goldstein et al., "Satellite Radar Interferometry: Two-dimensional Phase Unwrapping", Radio Science, vol. 23, No. 4, pp. 713–720, Jul.–Aug. 1988.

Schuler et al., "Measurement of Topographic Surface Slopes using Polarimetric SAR Images", Int. Geosc. and Remote Sensing Symp., Cal. Inst. of Tech., Aug. 8–12, 1994.

Schuler et al., "Measurement of Topographic Surface Slopes using Polarimetric SAR Images", Poster Presentation on display at Int. Geosc. and Remote Sensing Symp., Cal. Inst. of Tech., Aug. 8–12, 1994.

Arfken, "Mathematical Methods for Physicists", Academic Press, New York, N.Y., Sec. 7.4, pp. 428–436, 1985.

Swartz et al., "Optimal Polarizations for Achieving Maximum Contrast in Radar Images", J. Geophy. Res., vol. 93, No. B12, pp. 15, 252–15,260, Dec. 10, 1988.

MEASUREMENT OF TOPOGRAPHY USING POLARIMETRIC SYNTHETIC APERTURE RADAR (SAR)

BACKGROUND OF THE INVENTION

1. Field of the Invention

This invention pertains generally to topographic mapping and more specifically to the measurement of topography over a wide area utilizing a polarimetric synthetic aperture radar (SAR) installed in an aircraft or satellite.

2. Description of the Related Art

Wide-area measurements of topography currently utilize either stereo-photography or interferometric synthetic aperture radar (IFSAR). However, stereo-photography is limited by the weather, atmosphere (absorption, refraction, turbulence, etc.) and darkness.

Microwave interferometric SAR has shown promise as a wide-area technique for the measurement of topography but has its own set of limitations. Radar mapping utilizing interferometric principles was first applied in the late 1960's and early 1970's to earth-based observations of Venus and the moon. The simultaneous measurement of range, azimuth angle, and elevation angle provides the absolute three-dimensional location of each image point, thus radar images can be accurately transformed from slant range to ground range format. This enables the correction of radar artifacts such as foreshortening and simplifies the coregistration of diverse images. The combination of one interferometric channel with simultaneously operated channels (multifrequency, multipolarization) will permit automatic generation of multichannel three-dimensional geolocated radar images. The interferometric technique utilizes the property that a small time delay difference is associated with a phase shift. Phase measurements made by interferometric SAR provide the opportunity for accurate elevation measurements, however, a different set of measurement problems are created. The major phase measurement problems involve (1) exact knowledge of the scattering path geometry, (2) platform motion compensation, and (3) $2\pi$ phase ambiguities caused by abrupt elevation changes which require "unwrapping" algorithms and constitute recovering the multiples of $2\pi$ phase differences that "disappear" in an interferogram. See, Madsen et al., *Analysis and Evaluation of the NASA/JPL TOPSAR Across-Track Interferometric SAR System,* IEEE Trans. Geosc. and Remote Sensing, Vol. 33, No. 4, pp. 383–391, 1995; E. Rodriguez et al., *Theory and Design of Interferometric Synthetic Aperture Radars,* IEEE Proc.-F, Vol. 139, No. 2, pp. 147–159, 1992; Li et al., *Studies of Multibaseline Spaceborne Interferometric Synthetic Aperture Radars,* IEEE Trans. Geosc. and Remote Sensing, Vol. 28, No. 1, pp. 88–97, 1990; and U.S. Pat. No. 4,975,704, Gabriel et al.

Forest areas present additional problems for interferometric SAR since practical antenna baseline separations for aircraft and single satellite applications generally imply the use of microwave frequencies too high to penetrate forest canopy to the ground. Polarimetric SAR at the P-band and lower frequencies provide a method for the measurement of topography in forested areas and may be used as a measurement tool which can aid in solving the phase ambiguity problems of interferometric SAR. Polarimetric SAR slope and elevation measurements can provide bounds on the IFSAR phase path. Finally, the relative simplicity of fully-polarimetric real, and synthetic aperture, radar design has resulted in a rapid expansion in the number of such systems, application and datasets. Many of these datasets involve geophysical parameter measurements which may utilize the techniques taught by this invention to improve the estimate of the parameter.

SUMMARY OF THE INVENTION

The object of this invention is to provide a method and apparatus for the direct measure of terrain azimuthal slopes so as to derive an estimate of terrain elevation.

Another object of this invention is to provide an apparatus and method having low rms error values and high correlation values that is capable of providing topographic information over a wide area so that geophysical parameters, when such information is needed to correct radar studies of as soil moisture, biomass density, and crop type may be accurately measured by radar.

These and other objectives are attained by measuring the full amplitude of a phase scattering matrix obtained by measuring the orthogonal components, vertical and horizonal, of electromagnetic reflections of a synthetic aperture radar (SAR). These orthogonal components are analyzed in phase and amplitude to obtain a polarimetric signature of the terrain through the use of a scattering matrix of the electromagnetic reflections. Utilizing the method of steepest descent (or gradients) the polarimetric orientation of the peak (maximum) of the signature is determined for each image pixel. These orientations are proportional to terrain slope in the azimuthal direction. Processing of all the image pixels allows a map of the terrain slopes to be generated.

DESCRIPTION OF THE PREFERRED EMBODIMENT

Figure 1:
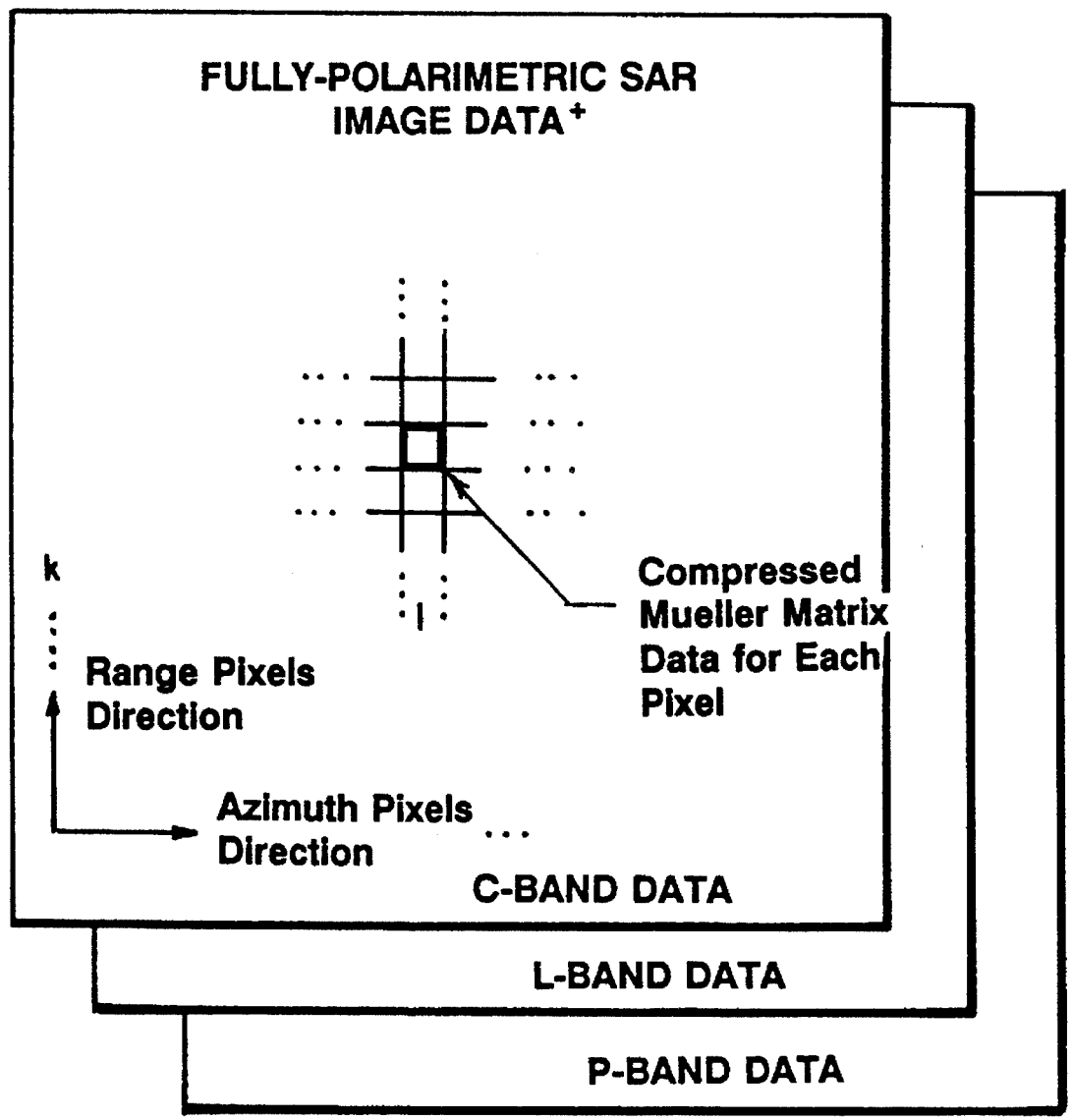
FIG. 1 shows the source of the Stokes-Mueller matrix data and its structure.

The polarimetric technique of measuring azimuth direction terrain slopes utilizes a polarimetric synthetic aperture radar (SAR) to provide a direct measure of terrain azimuthal slopes and a derived estimate of terrain elevation. Utilizing this measure of the azimuthal slopes and estimated terrain elevations, a one-dimensional terrain slope map over a wide area may be produced without any prior knowledge of the terrain. The terrain elevations are derived by integrating the slopes in the azimuthal direction and may be further refined so as to obtain absolute, rather than relative, elevation values by independently knowing at least one elevation "tie-point" along each slope profile being integrated. A complete two-dimensional topography elevation map can then be constructed from sets of elevation profiles spaced throughout the range direction.

This technique maximizes the electromagnetic scattering contact with the ground-plane for forested terrain slopes of much larger than a few degrees. Double bounce trunk-ground interactions are maximized for forested terrain by adaptively using polarizations which follow the position of the linear co-polarization (linear co-pol) maxima as the average terrain slope changes. Co-pol (that polarization having the same polarization a the transmit signal, HH and VV) signatures represent backscattered intensity plotted as a function of the polarization orientation angle, $\Psi$, and ellipticity, $\chi$. (An ellipticity of 0° corresponds to linear polarization, while an ellipticity of ±45° corresponds to circular polarization. For an ellipticity of 0°, an orientation of 0° corresponds to horizontal polarization and an orientation of 90° corresponds to vertical polarization.) The co-pol signature is obtained by setting the receive polarization signal equal to the transmit polarization. This technique assumes that the dominant scattering mechanisms, which create a linear-polarization maximum in the polarimetric signature for flat terrain, will create a similar maximum for terrain with large slopes, but the location of this maxima will change in response to the larger slope. If the flat terrain maximum occurs, for example, at 0° or 180° (HH-polarization) then the maximum terrain slopes of 20° will occur at approximately 20° and −20° at 160°. The near equality of the terrain slope and the shift in the polarization maximum will occur over a wide range of incident angles $\Theta_i$. This is because the two-bounce scattering in the vertical plane containing the trunk-ground approximation dihedral has a broad scattering pattern in the vertical plane. The forested terrain slopes measured by this method are not restricted to small angles. The preferred computational sequence is shown in Appendix I.

An expression for azimuthal terrain tilt $\delta=\delta(S_{ij})$, where $S_{ij}$ are components of a scatter matrix is derived to predict the terrain slope, $\delta$, for a linear co-pol case. (The subscript ij means the polarization j is transmitted and polarization i is used to receive the scattered waves.) The equation is based on the concept that terrain tilts $\delta$ in the azimuthal direction and will shift the position of a new orientation maxima $\Psi_m$ to a new value $\Psi_m+\delta$ when observed in a reference non-tilted plane. See, G. R. Valenzuela, *Scattering of Electromagnetic Waves From a Tilted Slightly Rough Surface*, Rad. Sci., Vol. 3, No. 11, pp. 1057–1066, 1968, which is hereby incorporated by reference in its entirety. For a vector E, the relationship between orthogonal coordinates [x,y] for the non-tilted surface and similar coordinates [x',y'] for a resolution cell tilted by an angle $\delta$ is given by $$\begin{bmatrix} E_{x'} \\ E_{y'} \end{bmatrix} = \begin{bmatrix} \cos(\delta) & \sin(\delta) \\ -\sin(\delta) & \cos(\delta) \end{bmatrix} \cdot \begin{bmatrix} E_x \\ E_y \end{bmatrix} \quad (1)$$

A scattering matrix, $[S_{ij}]$, of the form $$[S_{ij}]_{i'j'} = \begin{bmatrix} a_{HH} & 0 \\ 0 & b_{VV} \end{bmatrix} \quad (2)$$

is assumed, where $a_{HH}$ and $b_{VV}$ are orthogonal coordinates x',y' are parallel and perpendicular to the flat scattering plane whereas x,y are parallel to the tilted plane, respectively, and are constrained to be real. Scattering matrices of this form represent a valid scattering model for open terrain (slightly-rough scatter) and double-bounce (trunk/ground dihedral scatter) situations. To compute co-pol signatures in [x,y] coordinates, the scattering matrix is transformed into $$[S_{ij}] = \begin{bmatrix} \cos(\delta) & -\sin(\delta) \\ \sin(\delta) & \cos(\delta) \end{bmatrix} \cdot \begin{bmatrix} a_{HH} & 0 \\ 0 & b_{VV} \end{bmatrix} \cdot \begin{bmatrix} \cos(\delta) & \sin(\delta) \\ -\sin(\delta) & \cos(\delta) \end{bmatrix} \quad (3)$$

where a and b are real. Equation (3) reduces to $$[S_{ij}] = \begin{bmatrix} a_{HH}\cos^2(\delta) + b_{VV}\sin^2(\delta) & (a_{HH} - b_{VV})\cos(\delta)\sin(\delta) \\ (a_{HH} - b_{VV})\cos(\delta)\sin(\delta) & a_{HH}\sin^2(\delta) + b_{VV}\cos^2(\delta) \end{bmatrix} \quad (4)$$

$$\equiv \begin{bmatrix} S_{HH}, S_{HV} \\ S_{HV}, S_{VV} \end{bmatrix}$$

Where $S_{HH}$, $S_{HV}$, $S_{VV}$ are the complex measured values of the scattering matrix $[S_{ij}]_{x,y}$ from the tilted plane. The terrain tilt, $\delta$, is obtained by simultaneously solving the three relations for $S_{HH}$, $S_{VV}$, and $S_{HV}$ contained in Eq. (4). The solution for $\delta$ is $$\delta = 1/2 \tan^{-1}\left[\frac{2s_{HV}}{(s_{HH} - s_{VV})}\right] \quad (5)$$

The Stokes matrix $[M_{ij}]$ and the polarimetric signature can subsequently be developed from the model for the scattering matrix $[S_{ij}]$. The Stokes matrix relates to the Stokes vectors for incident and scattered waves. The Stokes vector of a transmitting antenna is a real four-dimensional vector, whose elements are the four Stokes parameters describing the polarization of the transmitted wave. The scattering matrix describes how the scatterer transforms the illuminating electric field upon scattering, whereas the Stokes scattering operator describes how the scatter transforms the incident Stokes parameters upon scattering. See, Schuler et al., *A Microwave Technique to Improve the Measurement of Directional Ocean Wave Spectra*, Int. J. Remote Sensing, Vol. 16, No. 2, pp. 199–215, 1995; S. L. Durden et al., *Modeling and Observation of the Radar Polarization Signature of Forested Areas*, IEEE Trans. Geosc. and Remote Sensing, Vol. 27, No. 3, pp. 290–301, 1989; van Zyl et al., *Imaging Radar Polarization Signatures: Theory and Observation*, Rad. Sci., Vol. 22, No. 4, pp. 529–543, 1987; and Ioannidis et al., *Optimum Antenna Polarizations for Target Discrimination in Clutter*, IEEE Trans. Antenna Propa., Vol AP-27, No. 3, pp. 357–363, 1979; which are hereby incorporated by reference in their entirety.

The orientation, $\Delta\Psi$, of the scattering maximum for the tilted terrain resolution cell observed in the non-tilted coordinate system has also been derived under the same constraints and $\Delta\Psi = \delta$. Results using this expression produces profiles that follow the terrain tilts and are computationally fast. The constraint that all of the scattering terms must be real (i.e., in phase) was found to cause some error in the determination of $\delta$. The measured slopes are less accurate and signal variance is greater than in a search-based algorithm.

A search-based formulation measures the location of the global maxima of a polarization signature, $\sigma(\chi,\Psi)$ in $(\Psi,\chi)$ space for co-pol signature that differs from the above in that it does a direct search for signature maxima, and makes use of the full amplitude/phase information contained within the Stokes matrix, $[M_{ij}]$. (The polarization signature is simply a way to display the synthesized scattering cross section for different polarizations.) Expression for the terms, $[M_{ij}]$, of the Stokes matrix in terms of $[S_{ij}]$ are well known to those practicing in the art. This technique may also be used in searches for local co-polar maxima and cross-polarization (cross-pol) signatures. (Co-pol being the transmission of electromagnetic waves of one polarization and receiving the reflected electromagnetic wave in the same polarization, HH and VV. The cross-polarization signature is obtained by setting the ellipticity of the receive antenna to the negative of the transmit ellipticity, and the orientation of the receive antenna to that of the transmit antenna plus 90°. Cross-pol on the other hand is the transmission of the electromagnetic waves in one polarization state and receiving the reflected electromagnetic wave in the opposite polarization state, HV.)

The location of the maxima is determined for each slant-range resolution cell (pixel). Changes in position of the maxima ($\Delta\Psi$) in the direction related to topography/dominant scatter mechanism, while changes ($\Delta\chi$) in the orthogonal direction are due to changes in ellipticity. Both shifts are stored as usable data products. The $\Psi$ changes are much larger than the changes in $\chi$, but this is not always the case. Stokes matrix, $[M_{ij}]$, parameters are used for each pixel. These parameters are then averaged in both range and azimuth directions to reduce the statistical (speckle or fading noise) variation and a polarimetric signature is formed using the average values. The spatial dimensions used for each slope estimate, preferably, can be from 120 m×120 m for forested terrain and 30 m×30 m for open-terrain, however any convenient dimension may be chosen depending upon the users preference. The preferential spatial dimensions were chosen to keep the polarimetrically measured slope standard deviation/mean ratio approximately for each data set. Forest scatter at P-band thus requires more averaging than open-terrain at L-band for the same measurement accuracy. It should be noted, however, that smaller spatial averages still produce usable, albeit noisier, results.

The location of the global maxima of the co-pol signature is then computed and the deviation of the global maxima from the quiescent value used as the slope in the azimuthal direction. The technique is well suited for use in tilted semi-rough, or for forest terrain where the scatter is relatively homogenous and is dominated by some small number of scattering mechanisms. In areas of heterogeneous scatter the global peak becomes weaker, the unpolarized pedestal increases, and the slope measurement is less accurate. The latter case is to be encountered at the boundaries between forests and open terrain. This technique adapts automatically to either open or forested terrain conditions once the boundary is passed.

The polarization synthesis equation, an expression for $\sigma(\Psi,\chi)$ in terms of the Stokes matrix $M_{ij}$ and the transmit and receive polarization vectors, is then developed $$\sigma(\chi,\Psi) = 4\pi/k^2 \begin{bmatrix} 1 \\ \cos 2\chi \cos 2\Psi \\ \cos 2\chi \sin 2\Psi \\ \sin 2\chi \end{bmatrix}^T M_{ij} \begin{bmatrix} 1 \\ \cos 2\chi \cos 2\Psi \\ \cos 2\chi \sin 2\Psi \\ \sin 2\chi \end{bmatrix} \quad (6)$$

where k is the radar wavenumber and T indicates a matrix response. Eq.(6) can be used to synthesize the scattering response for any $(\chi,\Psi)$ polarization state.

The normalized cross-section is $$\sigma = s^t M s \quad (7)$$

where s is the Stokes transmitting (or receiving vector since they are equal for the co-pol case) and t denotes the vector transpose, and, without losing generality, the Stokes vector is $$s = \begin{bmatrix} 1 \\ \cos(2\chi)\cos(2\Psi) \\ \cos(2\chi)\sin(2\Psi) \\ \sin(2\chi) \end{bmatrix} = \begin{bmatrix} 1 \\ a^1 \\ a^2 \\ a^3 \end{bmatrix} \quad (8)$$

with the vector a satisfying $a^t a = 1$. Since the Stokes matrix, $M_{ij}$, is symmetric, Eq. (7) can be $$\sigma = m_{11} + 2b^t a + a^t C a \quad (9)$$

and b and C contain elements from the Stoke matrix, m, $$b = \begin{bmatrix} m_{12} \\ m_{13} \\ m_{14} \end{bmatrix}, c = \begin{bmatrix} m_{22}, m_{23}, m_{24} \\ m_{23}, m_{33}, m_{34} \\ m_{24}, m_{34}, m_{44} \end{bmatrix} \quad (10)$$

The optimization problem then becomes one of maximizing Eq. (9) subject to the constraint of $a'a=1$. The Lagrange multiplier method, supra, pp. 163–177, discussed in A. E. Bryson et al., *Applied Optimal Control*, Chapter 1, Blaisdell Publication Company, Waltham, Mass., Toronto, Ont., Canada, may be applied to produce an analytical solution. This method requires the solution of three, third-degree, simultaneous equations, which are difficult to solve analytically. Therefore, the preferred method of solution is the method of steepest descent, which is well known to those practicing the art.

Utilizing the method of steepest descent (or gradients), accelerates the computation for locating the maximum of the co-pol and uses iterative methods to locate the maximum or minimum. See, D. E. Kirk, *Optimal Control Theory An Introduction*, Prentice-Hall, Englewood Cliffs, N.J., pp. 331–342, 1970. The use of the Stokes matrix approach in finding the optimal polarization state to maximize the contrast between targets and clutter rather than other similar approaches is found to be more computationally efficient than other well-known methods.

The gradient of $\sigma(\chi,\Psi)$ with respect to a is, $$\alpha\sigma/\alpha a = 2 \; (b + Ca). \quad (11)$$

Starting from an initial value for a, the maximum is reached by iteratively updating on a unit sphere of $a'a=1$ in the direction of the gradien.

The maximum search procedure then requires:

(1) Setting the vector a to an initial value, namely, $a'=[-1, 0, 0]$, (2) computing the gradient using Eq. (11), and then (3) updating the vector a by the equation $$a' = a + \Delta\alpha\sigma/\alpha a \quad (12)$$

where $\Delta$ is the step size. The a' is then normalized by $$a^{(new)} = a'/(a')'a'. \quad (13)$$

$$a^{(new)} = a'/(a')'a'. \quad (13)$$

(4) Then let $a = a^{(new)}$, and go back to step (2). The iteration terminates if a fixed number of iterations has been reached, or when $$\text{MAX} \; (|a^{(new)}(i) - a(i)|) < 0,0001 \quad (14)$$

(5) Finally, compute the ellipticity and the orientation angles by

Ellipticity, $\chi = \sin^{-1} \; (a_3)/2$,

Orientation, $\Psi = \tan^{-1}(a_2/a_1)/2.$ \quad (15)

The figure $\Delta = 20/m_{11}$ works well. The division by reduces the variations of the gradient magnitudes that are larger for higher radar return areas. For returns from forested areas dominated by scattering from trunk-ground corner reflectors, co-pol signatures may have more than one local maximum. This situation differs from that occurring in open terrain (desert or grassy areas) where single-maximum slightly rough scattering is dominate. To obtain the second local maximum the above equation must be modified by initiating another value in $a=[1,0,0]$, and then by following the same procedure. The $\sigma$ values for these two local maxima are computed using Eq. (9), and the vector a associated with the maximum $\sigma$ is used in the computation of $\Psi$ and $\chi$ as in Eq. (17), In general, forested terrain has two local maxima while open terrain only has one maximum. The foregoing procedure has the advantage that it automatically distinguishes open terrain from forested terrain.

Terrain slopes can be sensed for forested terrain at ground-level with an accuracy of 2° (moderate relief areas) to 3.2° and a correlation coefficient of greater than 0.8 when compared to digital-elevation map (DEM) values for a similar area. Terrain elevation profiles can be derived from the primary slope measurements and have accuracies of 8.4 m (moderate relief areas) to 18 m with correlation coefficients greater than 0.9. The technique described herein allows sensing of topography for forested terrain having slopes up to at least ±25°.

It is sufficient, for topographical studies, to use the maximum of the linear polarization case ($\chi=0$) for the slope estimate. To find the maximum for the linear polarization case the calculation is simpler. The dimension of the vector a reduces to two; only $a_1$ and $a_2$ are to be searched for this optimization. The same procedure as the three dimension search case is applied, and this simplified calculation is about 40% faster than the one for locating both $\Psi$ and $\chi$.

Figure 2:
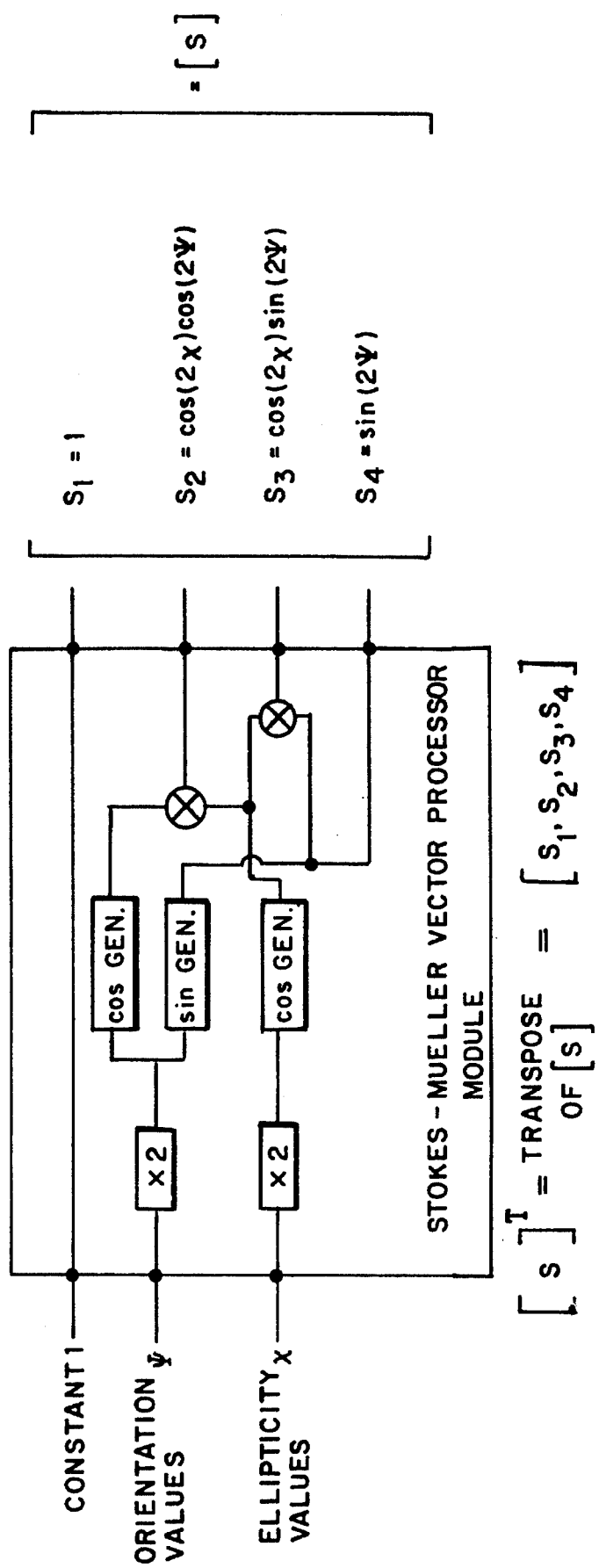
FIG. 2 shows the Stokes vector processor module.

Referring to FIG. 1, the polarimetric SAR data is utilized to compute the Stokes-Mueller matrix, [M]. The Stokes matrices for each pixel consist of a compressed 4×4 matrix whose terms are each products of complex terms of the scattering [S] matrix. When raw data is uncompressed (in a standard processing module) a matrix of range and azimuth pixels is obtained with each pixel having 10 numbers in it. These 10 numbers are the independent values of the 4×4 Stokes-Mueller matrix, M. The other 6 values of M can be derived using equations known to those practicing the art. The Stokes-Mueller Vector processor module, FIG. 2, inputs polarization orientation and ellipticity values (to any desired accuracy). The output is a quartet of numbers assembled as a 1×4 column vector, S, the Stokes Vector. The transpose is also constructed by making a 4×1 row vector, S'. These two quantities are used in the process module for forming Polarimetric Signatures $\sigma(\Psi,\chi)$.

Figure 3:
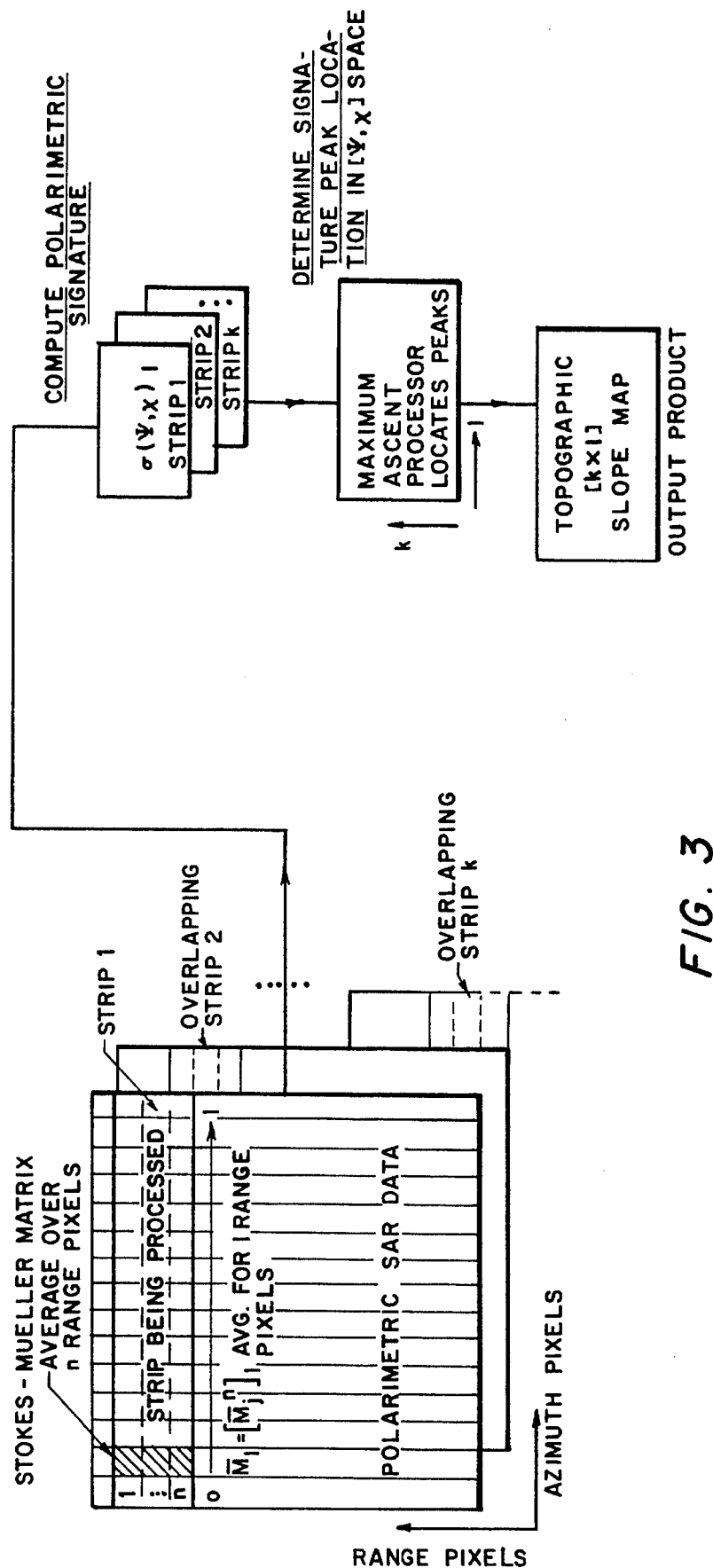
FIG. 3 shows the flow diagram for the generation of a topographic slope map from measured polarimetric data.

The Polarimetric Signature module ingests complex polarimetric radar scatter [S] and Stokes-Mueller matrix [M] data obtained from the SAR remote sensing data-collection platform. The scatter matrix consists of four complex terms $S_{VV}$, $S_{HH}$ (the vertical and horizontal polarization) and $S_{VH}(=S_{HV})$ the cross-pol terms. From [S] the components of the Stokes-Mueller matrix [M], a 4×4 matrix, can be computed using relations well-known to the practitioners of the art. The values of [M] are then used to compute the polarization signature $\sigma(\Psi,\chi)$ in the relationship $$\sigma(\Psi,\chi) = [S'] \cdot [M][S]$$

where,
$S' = [1, \cos(2\chi)\cos(2\Psi), \cos(2\chi)\sin(2\Psi), \sin(2\chi)]$
S = column vector transpose of $S'$
$\sigma(\Psi,\chi)$ = The Polarization Signature Referring to FIG. 3, input measured data consists of calibrated, independent estimates of the polarimetric Stokes-Mueller matrix, M, (ten numbers) for each image pixel (picture element). These 10 numbers are derived from the complex scattering matrix, S. The relations between S and M are well known to those practicing the art and are given by Eq. (1). The flow diagram of FIG. 3 shows (on the left) an array of image pixels in the radar range and azimuthal directions. Typically this array is 1024×1024 in size. The actual data is collected by polarimetric radar's mounted on an aircraft data-collection platform. Individual pixels are too noisy to yield good slope estimates. For this reason, Stokes-Mueller matrix values are first averaged for a number, N, of pixels in the range (vertical) direction. This averaging process is continued in the azimuthal (horizontal) direction for each of the one pixels. A strip 1-pixels long, centered at a range of N/2 pixels, is thus formed (strip #1). Subsequent overlapping strips of averaged Stokes-Mueller matrix values are formed by moving down by one range pixel and repeating the process to form overlapping strip #2. This process stops with a final strip #k being formed at the bottom of the image. The polarimetric signature is computed for each of the (average az pixels) in each of the k strips in the new (k×l) signature array. An efficient processor, called a Polarization Signature Maxima Location Module or Maximum Ascent processor, using the mathematical method of steepest descent, is then used to locate the position of the peak (or maximum) of the polarimetric signature in orientation, $\Psi$, or ellipticity, $\chi$. Final processing is done in a Topographic Slope Map module which relates the changes in polarimetric orientation to terrain slope values for each of the k×l pixels. This module utilizes either (1) radar flat-earth incidence-angle Oi corrections or, (2) local pixel-by-pixel incidence angle data (if available). This final correction of the data adjusts the linear one-to-one relationship between orientation change and terrain slope in portions of the image where the incidence angle is small ($\Theta i<30$) and corrections are needed to improve the slope estimate. Flat-earth $\Theta i$ corrections are known from the flight geometry. Local incidence angle corrections require a knowledge of terrain slopes in the range direction. This information is available if orthogonal direction data collection passes are made. Generally, the flat-earth correction will be enough to correct the slope map.

Figure 4:
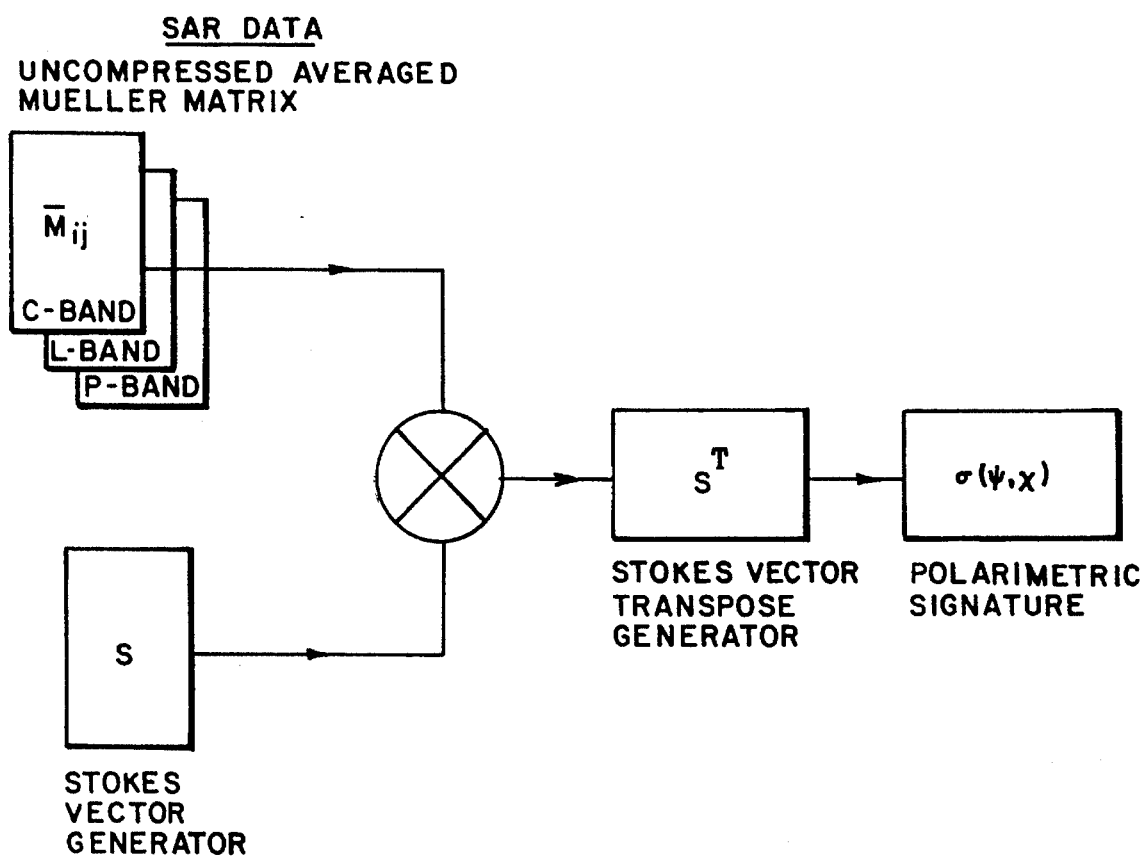
FIG. 4 shows the process for generation of a polarimetric signature from uncompressed, averaged Stokes-Mueller matrix data.

FIG. 4 shows the process needed to generate a polarimetric signature from the uncompressed, averaged Stokes-Mueller matrix data. These operations are performed on a pixel-by-pixel basis using the k×l matrix data created in FIG. 3. This $M_{jk}$ data is multiplied by a row-vector, S, which has been generated in a separate module. This output is then multiplied by the (column) transpose of S, $S^T$. The result is an k×l size matrix of $\sigma_{k,l}\Psi,\chi$ values. Each of the $\sigma_{k,l}$ matrixes is itself 180×90 values which are the value of the signature for all possible orientations (180 values) and ellipticities (90 values) measured to an accuracy of +0.5.

Figure 5:
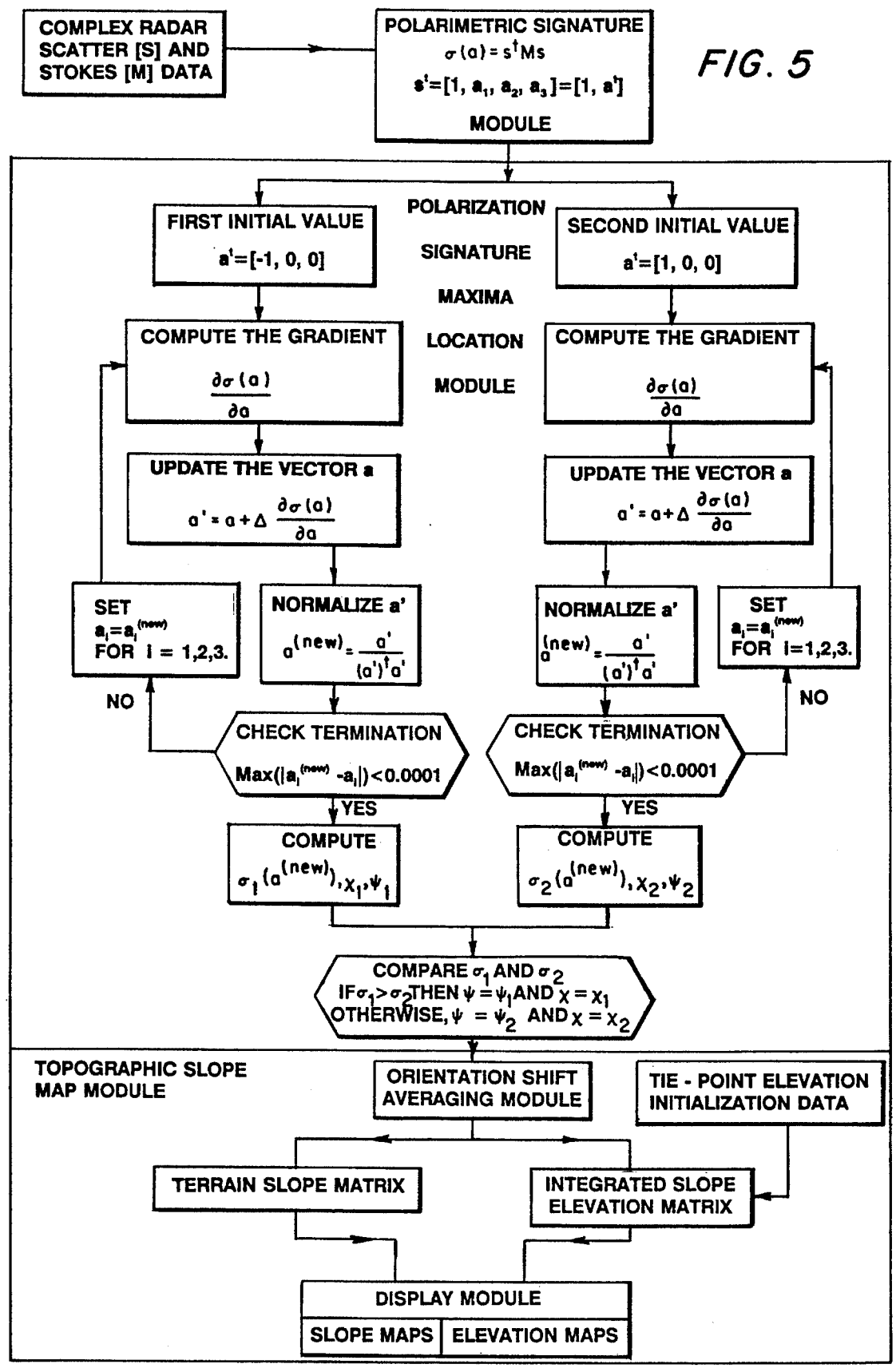
FIG. 5 shows the flow diagram for the generation of a topographic slope or elevation map from measured polarimetric data.

The matrix of polarization signatures are then inputted to a following module, the Polarization Signature Maxima Location Module or Maximum Ascent Processor module, FIG. 5, locates the polarization maxima (in ($\Psi,\chi$) space) on a pixel-by-pixel basis. There is often more than one maxima. The operations of this module, implemented using a microprocessor, implement the mathematical Method of Steepest Ascent (or Descent) which is an efficient means for locating maxima and minima. In this application there is a real possibility of the existence of more than one maxima. For this reason the processing flow breaks into two parallel paths involving two initial values, initial Stokes vectors of a=a'= [−1,0,0] and a'=[1,0,0] are used. The paths are identical except for the point at which the search for the maxima begins. The first path (left in figure) starts with the value a=a'=[−1.0.0]. This point corresponds to a point in [$\Psi,\chi$] space of [90°,0°]. The second path (right in figure) starts with the second value a'=[1,0,0] which corresponds to a point in [$\Psi,\chi$] space of [0°,0°]. The rationale for choosing these two starting points was that (1) all single bounce terrain scatter produces peaks with $\chi=0°$ and $\Psi$ angle spacings of 90°, or 180°, and (2) double-bounce scatter produces values with $\chi\neq0°$, but with the mean ellipticity value of the scatter $\overline{\chi}=0$ and, again, the peaks occur at $\Psi$ spacings of 90°, or 180°. Terrain slopes will, of course, move the peaks away from these flat-earth locations, but the two chosen initial values are efficient start points for locating all the peaks. The search for the polarization peaks is done in [$\Psi,\chi$] space using a three-component vector a which is the part of the Stokes-Mueller vector S which actually varies as a function of $\Psi$ and $\chi$. The process of finding the maxima $\sigma_1$ (or 2)($\chi,\Psi$) is an iterative walking process up $\sigma$ hills in which successive "steps" are always made in the direction of the steepest gradient. This walking process is subject to the one-constraint that $a^Ta=1$. This condition means that each normalized back into a sphere $a^Ta=1=a_1^2+a_2^2+a_3^2$. This condition is demanded by a realizability condition on co-polar scattering solutions. After normalization the old value a compared with the new value. If max(1 $a^{(new)}-a,1)<0.0001$ then the maximum has been found and the looping stops. If the difference is too great it continues. The processor iterates solutions and step sized until the paths reach maxima $\sigma_1$ and $\sigma_2$ then $\sigma_1$ ($\Psi,\chi$) is the maxima. Otherwise, $\sigma0_2$ ($\Psi,\chi$) is the largest maxima. Once a satisfactory maxima has been found $\chi$, and $\Psi$ values are computed by $\chi=\text{Sin}^{-1}(a_3)/2$ and $\Psi=\text{tan}^{-1}(a_2/a_1)/2$. Finally, if maxima are found for the two looping paths which have different ($\chi,\Psi$) solutions, then the larger one is chosen. In other words, the polarization signatures for each image pixel are ingested by the Polarization Signature Maxima Location Module to determine the ($\Psi,\chi$) space location of the largest signature maxima. The signature maxima, whose shift from a flat-earth location may be related to slope, are then averaged to improve their signal-to-noise ratio. The processing of the Orientation Averaging Module of the Topographic Slope Map Module combines a number (typically 50–100 pixels) of the individual pixel maximum locations together to obtain an accurate estimate. This averaging procedure reduces the effects of speckle and noise so that a more accurate estimate of the changes in orientation $\delta\Psi$ is obtained. At this point in the flow either terrain slope or elevation matrices can be formed and displayed. The formation of terrain elevation maps requires two additional processing steps. First, the elevations for each row of azimuthal pixels must be initialized by a known elevation "tie-point". Secondly, the slope values must be integrated in the azimuthal direction. Once these two steps are completed a terrain elevation map may be produced by carrying out the initialization and integration for each row in the range direction.

Figure 6:
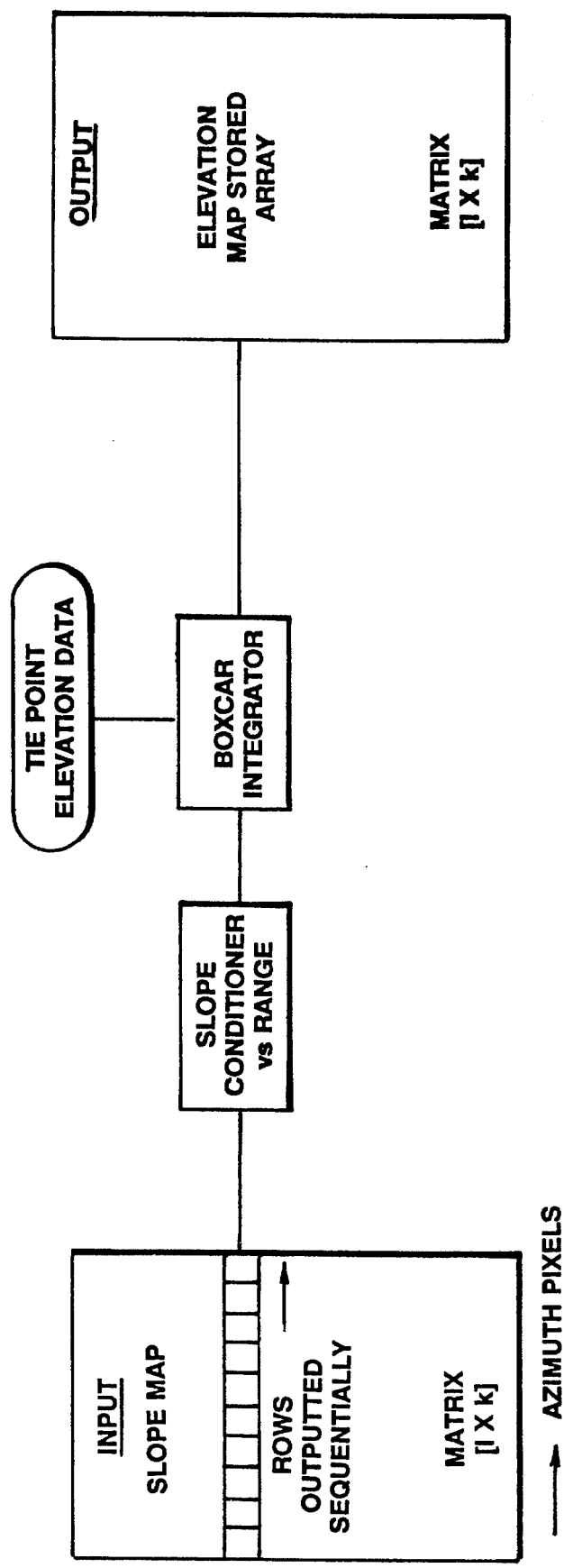
FIG. 6 shows the slope to elevation processor.

The integrated slope elevation matrix, FIG. 6, is required when topographic elevation maps are the final product rather that slope maps. The k×l values which are outputted by the Topographic Slope Map module are fed to a boxcar integrator which integrates the slope data into elevation data. The initial elevations at the start of the integration must be known (one per azimuthal strip) from external sources. The elevation data is stored as a k×l output matrix in the processor.

The output terrain elevation map may be displayed as a surface plot versus range and azimuth distances in meters. If the original radar image can be registered with several known locations on the ground, then this surface can be plotted versus latitude and longitude as well.

Figure 7:
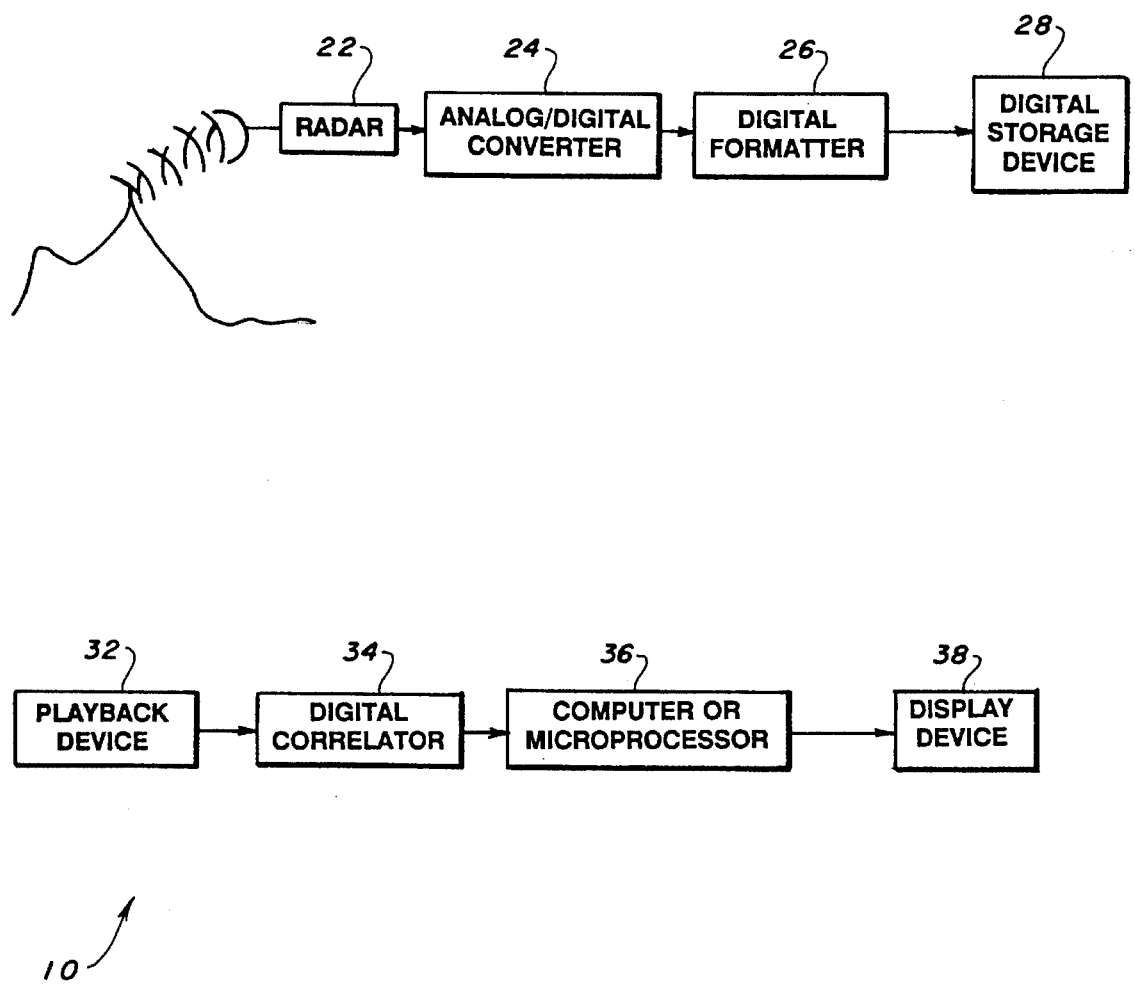
FIG. 7 shows the apparatus for acquiring polarimetric data and processing such data to a three-dimensional topographic map.

In the apparatus for implementing the foregoing method, referring to FIG. 7, a polarimetric synthetic aperture radar (SAR) 22, operating, for instance, at the L-band frequency of 25 cm, alternately transmits horizontally and vertically polarized pulses. During the interpulse period, both polarizations are received and amplitude and phase measurements are passed through an analog-to-digital converter 24 where the radar's analog signal is converted into a digital data bit stream and formatter 26 where the digital bit stream is formatted and then recorded and stored directly in a data storage device 28, such as a high density magnetic digital tape recorder or equivalent laser disk recording device. See, J. J. van Zyl, *Unsupervised Classification of Scattering Behavior Using Radar Polarimetry Data,* IEEE Trans. Geosc. and Remote Sensing, Vol. 27, No. 1, pp. 36–45, which is incorporated herein in its entirety, for a discussion of the data acquisition techniques. The data is collected in or converted to a digital domain for image manipulation purposes and stored in the data storage device 28. The digitally formatted stored polarimetric SAR electromagnetic reflections are direct measures of the complete scattering matrices for each resolution element. At the end of the data acquisition phase, the data tape or laser disk containing the digitally formatted scattering matrices is removed from the storage device 28 and interfaced with a playback unit 32 and digital correlator 32.

This technique is about 20 times faster than currently utilized methods and speeds up the overall computation of terrain elevations by a factor of five. The method of steepest descent has an error of smaller than 0.01°, more accurate than current methods.

In an experimental evaluation of the above-stated topographical mapping techniques, the Naval Research Laboratory obtained a 1989 data-set of NASA/JPL polarimetric AIRSAR flown on a DC-8 aircraft over a region near Villingen/Schwenningen, Germany in the Black Forest region. This area has been overflown in both the MAESTRO-1 1989 and MAC-Europe 1991 campaigns to provide wide-coverage polarimetric SAR images which could be compared with forest classification studies done on the ground. Because of these studies considerable information on local topography and forest-type was available. The test set forth below utilized the JPL/AIRSAR polarimetric SAR data acquired during MAESTRO-1 1989 and was greatly expedited by using a co-registered (1) calibrated P-band SAR image, and (2) a georeference file for the same area. The georeference file contained values of seven terrain/radar geometric variables, including terrain elevation and local incidence angle, which were re-binned to match the SAR image pixels. The DEM contained within the georeference file was made by the State of Baden-Wurttemberg using a stereo photography technique. This DEM is, therefore, a measure of the terrain canopy, rather than ground, level. The topography was measured on a 30×30 m grid by the Baden-Wurttemburg government study. The rms elevation error of the DEM over the portions of the study area without extreme slopes is ±3 m. Derivatives of elevations from this DEM were used as estimates of local terrain slopes.

The AIRSAR data was acquired during a pass from west to east over the Black Forest study area. The image contained 1024 pixels (range direction) by 752 pixels (azimuth direction) each pixel having dimensions in the slant range 6.6 m by 12.1 m (4-look data), respectively.

Figure 8:
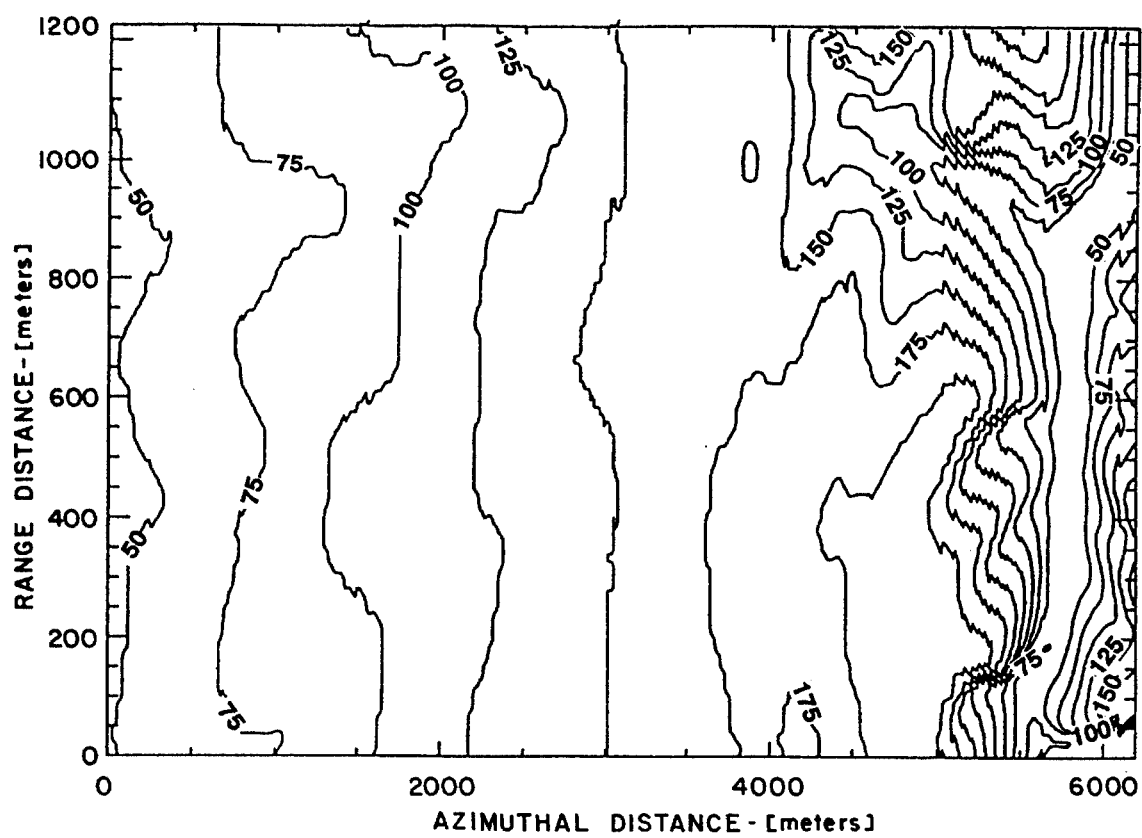
FIG. 8 shows the topography of the Breg River valley topography.

The topography of the area of the Black Forest consisted, in essence, of a forested gently rising (3°–4° slope) plateau bounded on either side by deeply indented river valleys formed by the Breg and Brigach Rivers. This area was a useful study area because most of the topographic changes occurred in the azimuthal direction—and thus the complications due to radar height-related "lay-over" in the range-direction were largely avoided. Forest terrain slopes leading down to the Breg River often reached values of 25°–30°. The topography of the indented is shown in FIG. 8 with the contours represented in meters above a reference level. The georeference file terrain elevation values (the DEM) were collected on a 30×30 m grid.

All estimates of terrain slope reported here by either the radar, or georeference file, were made with 121 m (10 pixel) averaging in the azimuthal direction and 119 m (19 pixel) averaging in the range direction. The convention was taken that East-West terrain slopes that are upward above the horizontal are considered positive.

Figure 9A:
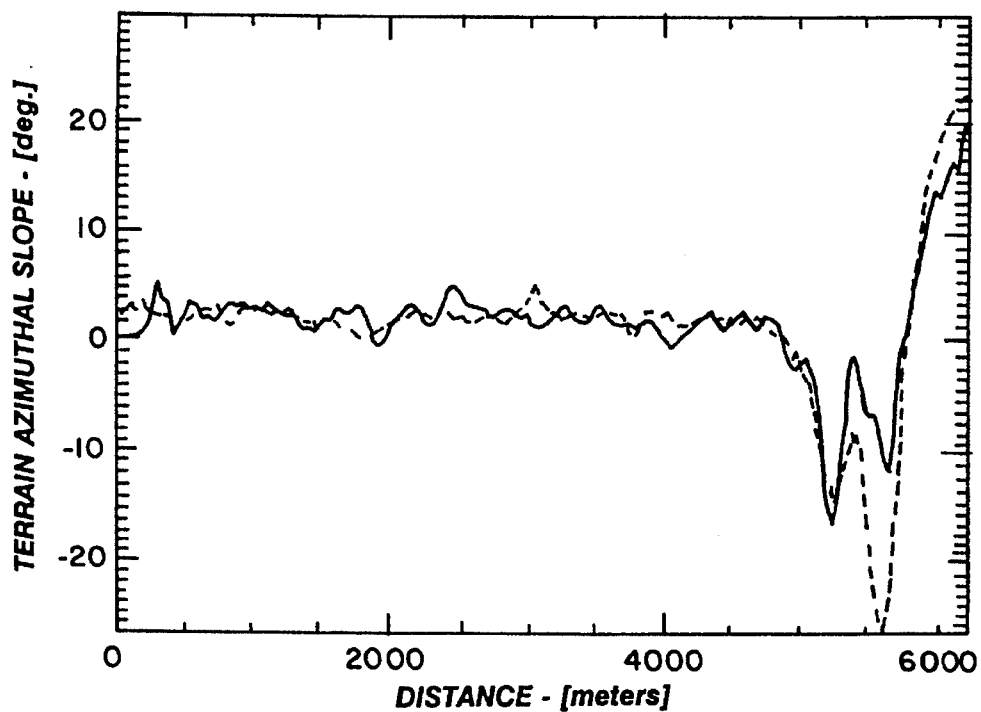
FIG. 9a shows the terrain azimuthal slope profile comparison between those shown on the digital-elevation map (DEM) and those obtained by the polarimetric synthetic aperture radar (SAR) on a azimuthal transect of the Breg River valley at a range of 300 meters.
Figure 9B:
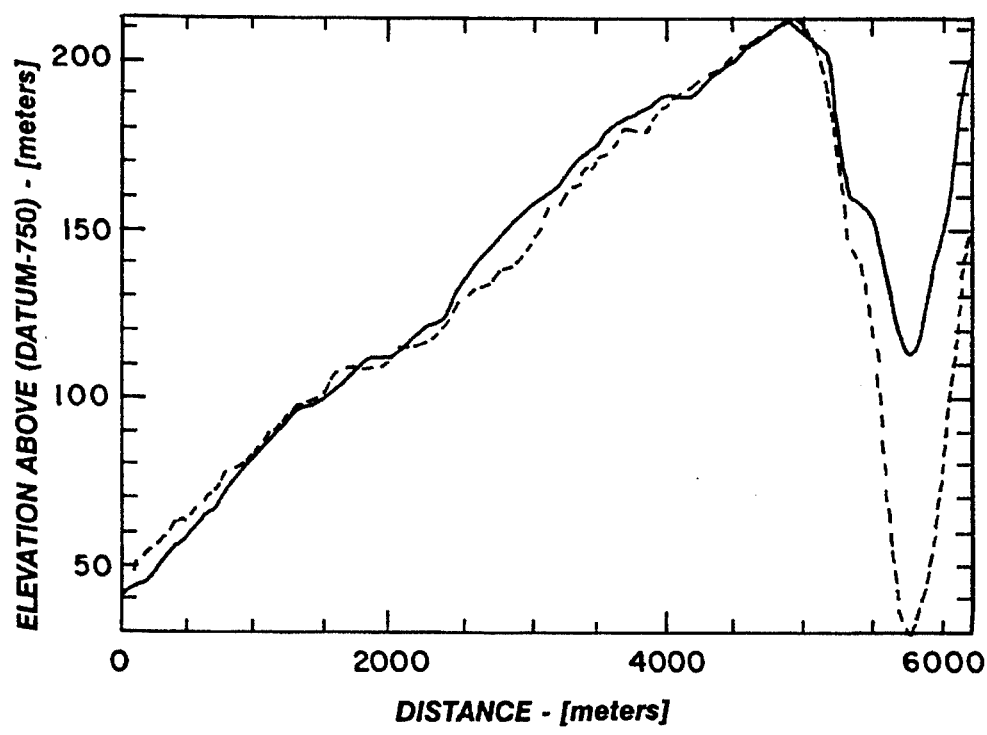
FIG. 9b shows an estimate of the terrain elevation profile on a directional transect of the Breg River valley at a range of 300 meters.
Figure 10A:
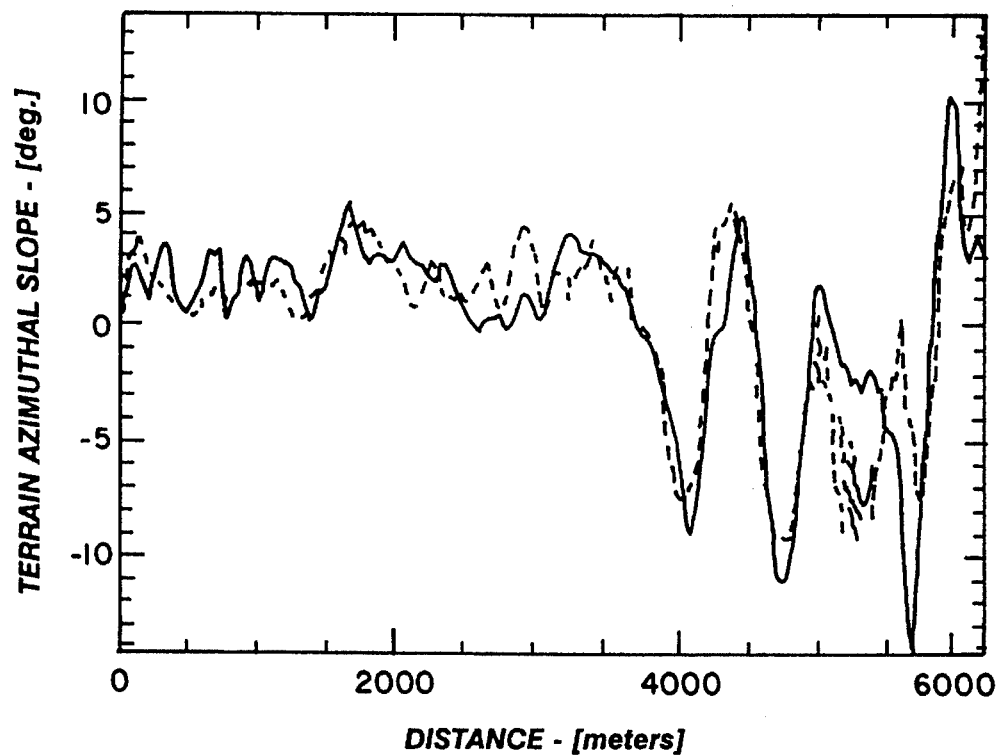
FIGS. 10a shows the terrain azimuthal slope profile comparison between those shown on the digital-elevation map (DEM) and those obtained by the polarimetric synthetic aperture radar (SAR) on a azimuthal transect of the Breg River valley at a range of range of 700 meters involving more complex terrain slopes.
Figure 10B:
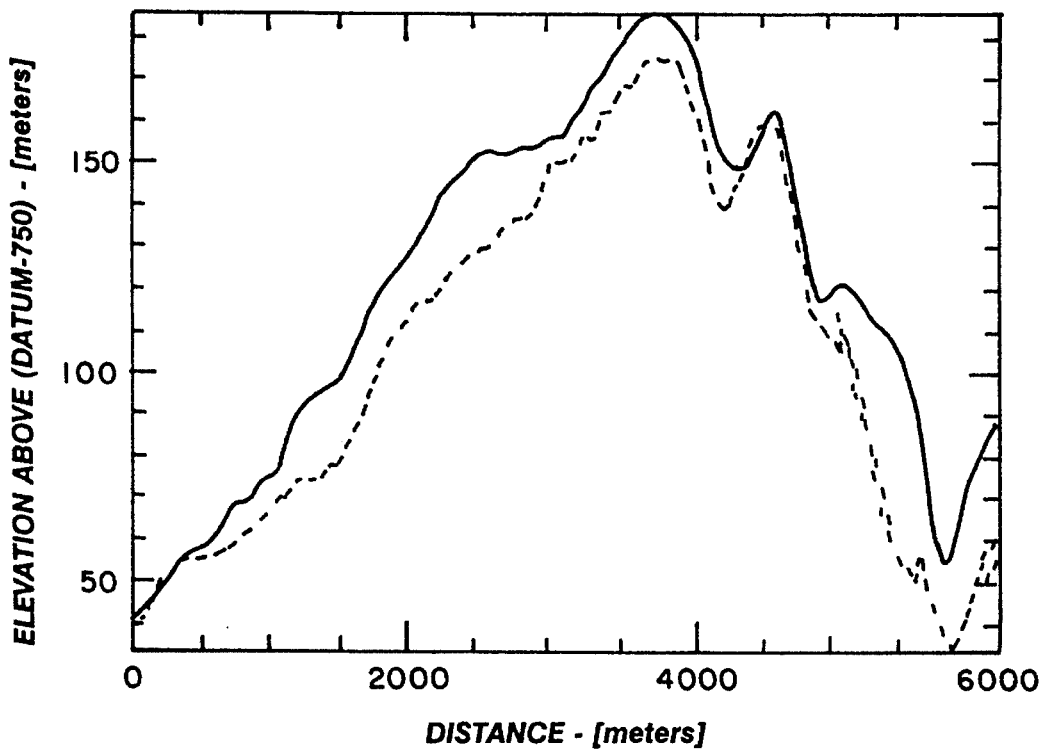
FIG. 10b shows the terrain elevation profile on a directional transect of the Breg River valley at a range of 700 meters.
Figure 11A:
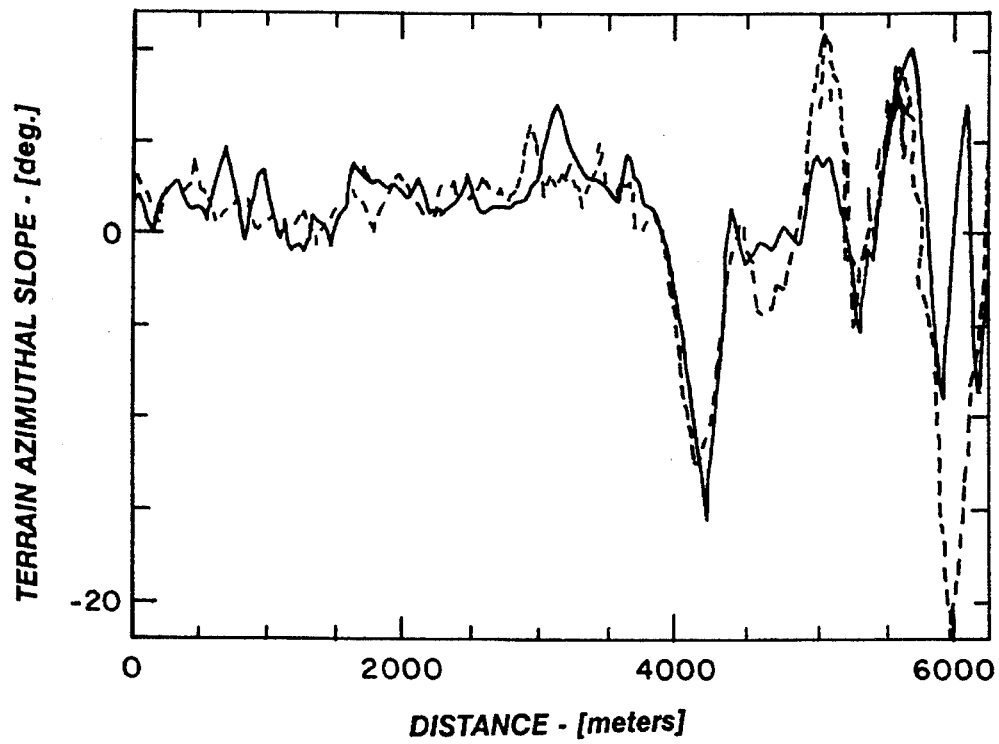
FIG. 11a shows the terrain azimuthal slope profile comparison between those shown on the digital-elevation map (DEM) and those obtained by the polarimetric synthetic aperture radar (SAR) on a azimuthal transect of the Breg River valley in areas near where it divides in two at a range of range of 725 meters involving more complex terrain slopes.
Figure 11B:
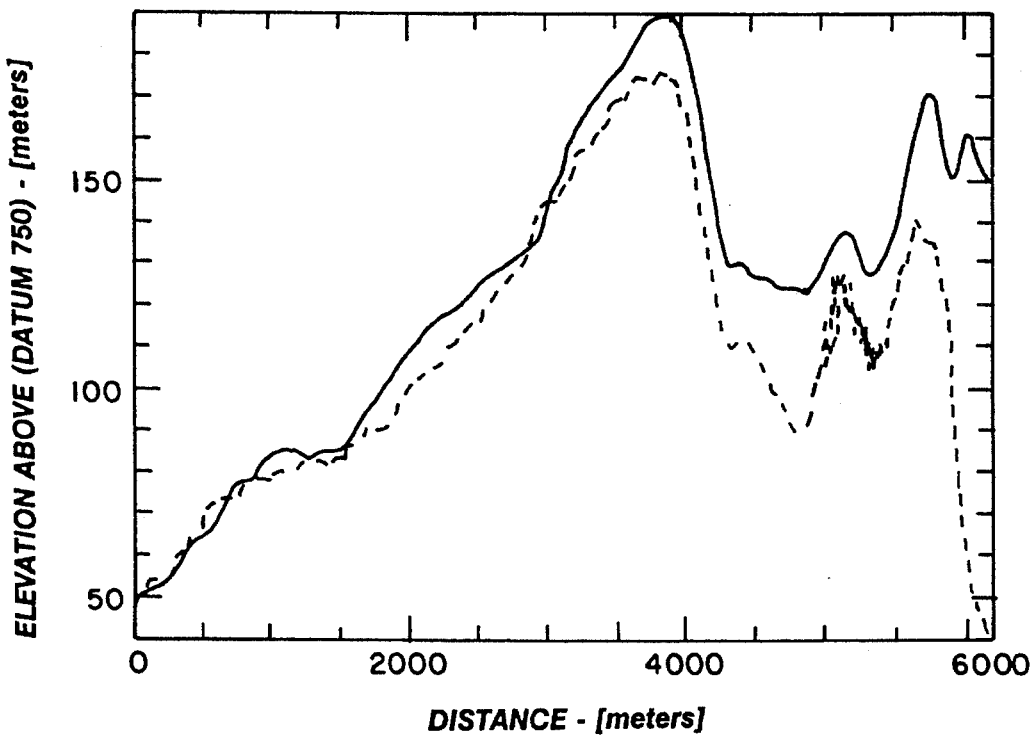
FIG. 11b shows the terrain elevation profile on a directional transect of the Breg River valley in areas near where it divides in two at a range of 725 meters involving more complex terrain slopes.
Figure 12A:
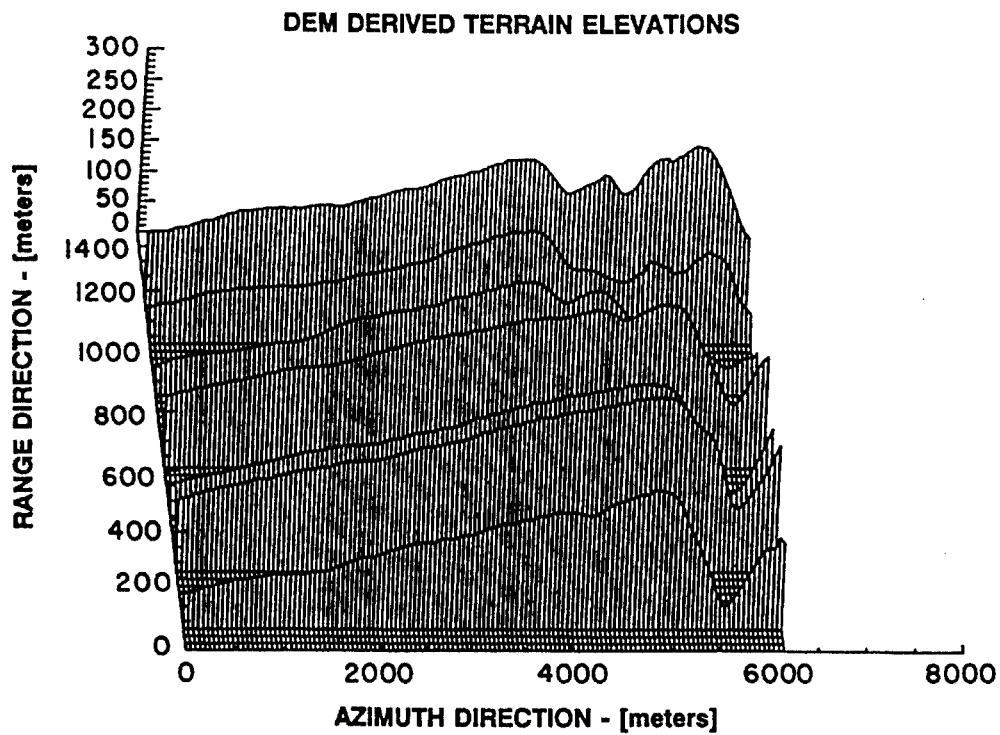
FIG. 12a shows the spaced elevation profiles derived from the DEM terrain elevations in the Breg River valley.
Figure 12B:
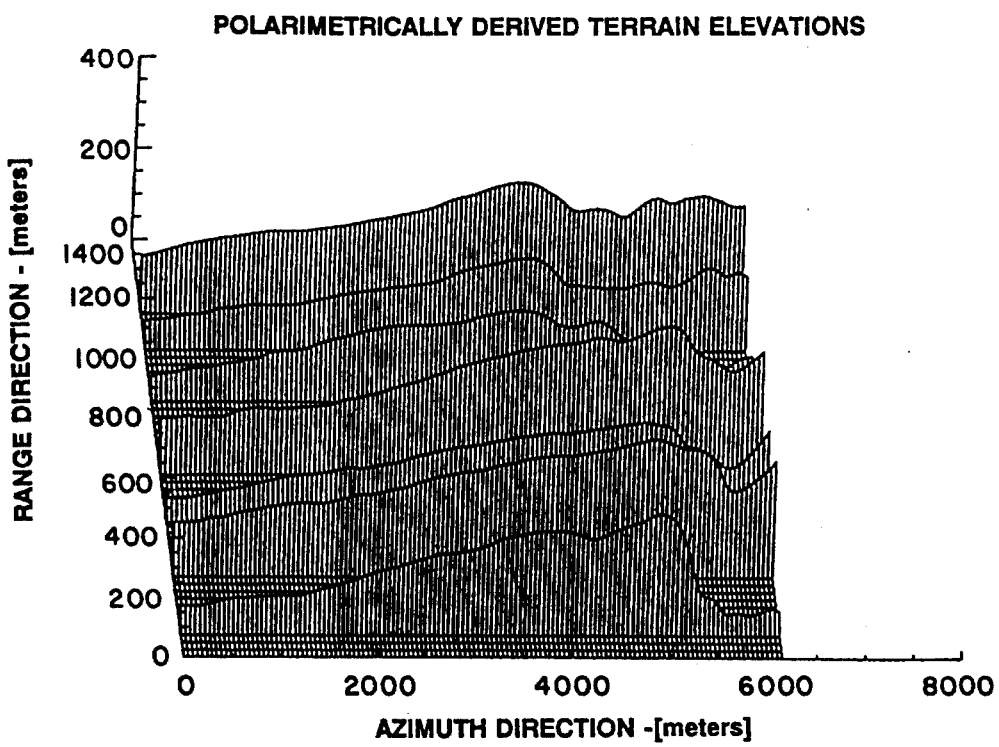
FIG. 12b shows the spaced elevation profiles derived from the polarimetric radar slope measurements in the Breg River valley.
Figure 13:
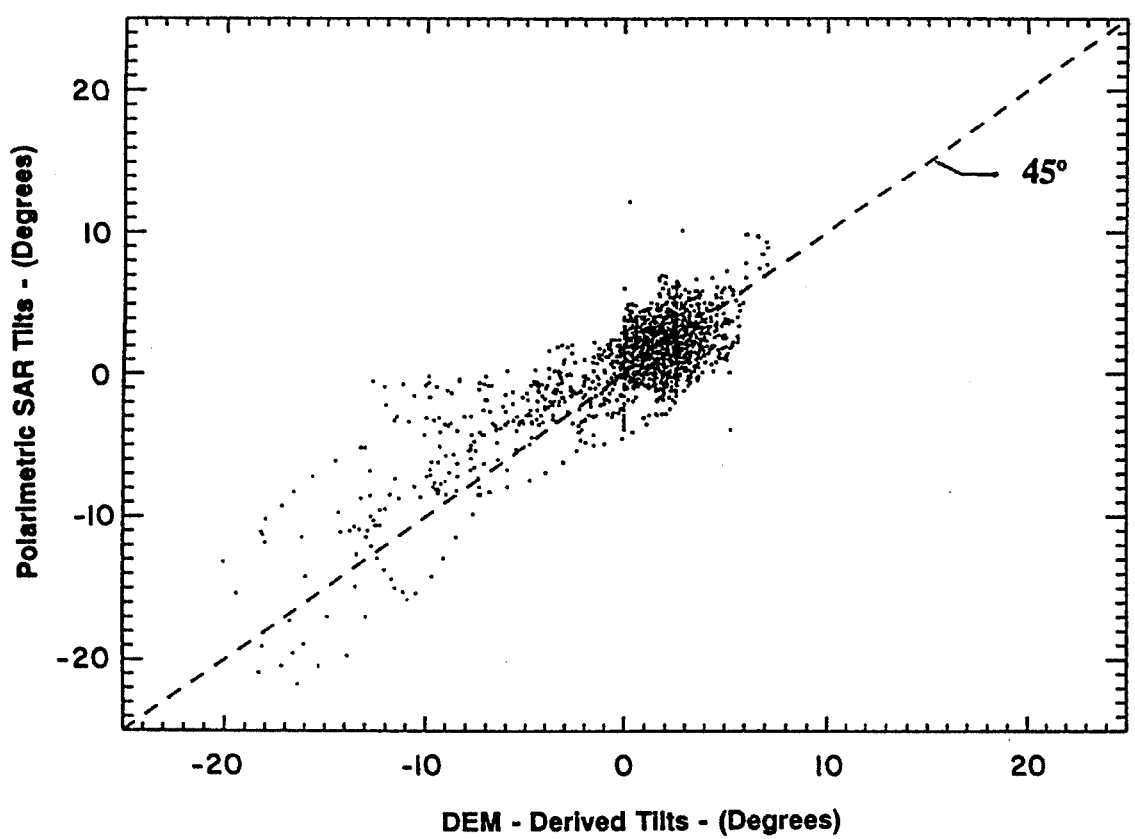
FIG. 13 shows the scatter plots for the spaced elevation profiles derived from the polarimetric SAR tilts versus the DEM tilts derived from FIG. 12a and 12b.

Profiles transecting the Breg River valley were measured at different North-South locations. FIG. 9a gives an example of a terrain slope profile obtained by a transect of the Breg River valley above a datum of 300 m. In FIG. 9a, and the subsequent figures, values obtained from the DEM are shown as dashed lines and the terrain slopes obtained from the polarimetric SAR are shown by a solid line. FIG. 9a traces the plunge from the high ridge of the forested plateau past an upward spike (German highway 1-180) to the Breg River (where the slope=0) and up the opposite side of the valley. An estimate of the terrain elevation profile is given in FIG. 9b above a datum of 300 m. FIG. 9b was obtained by integrating the radar slope data. The value of elevation at zero (azimuthal) distance was initialized to be equal to the DEM values. FIGS. 10a shows the terrain azimuthal slope profile comparison between those shown on the digital-elevation map (DEM) and those obtained by the polarimetric synthetic aperture radar (SAR) on a azimuthal transect of the Breg River valley at a range above a datum 725 m involving more complex terrain slopes. FIG. 11b shows the terrain elevation profile on a directional transect of the Breg River valley at a range of 725 meters. FIG. 11b transects the Breg River valley in areas near where it divides in two (FIGS. 11a and b) yielded more complex slope profiles but again the correlation between DEM and measurements by the polarimetric SAR spaced across the Black Forest study area and the Breg River gave results similar to those of FIGS. 90a and b and 10a and b. FIGS. 12a and b gives spaced elevation profiles derived from the polarimetric radar slope measurements and taken directly from the DEM. FIGS. 12a and b show good elevation agreement and feature correlation but some under-estimation of the depth of the valley is evident. FIG. 13 gives scatter plots for these same elevation profiles for the Black Forest study area comparing derived DEM slopes with polarimetric SAR derived slopes for all profiles. In FIG. 13 the dashed line at 45° represents perfect agreement between the measurement of the DEM and polarimetric SAR derived slopes.

Slope profiles derived from the lower frequency L-band data correlated reasonably well with the P-band profiles. The larger slope-estimation variance at L-band, and at a C-band experiment, indicates that canopy, and/or branch scattering is dominant for these datasets.

The accuracy (rms error) and correlation coefficient (SAR/DEM) for the technique is given in Table 1. The rms errors/correlations achieved are judged relative to the DEM. The DEM itself only had a ±3 m elevation accuracy for the relatively flat areas in the image and overall a 6 m quantizing error.

Figure 14A:
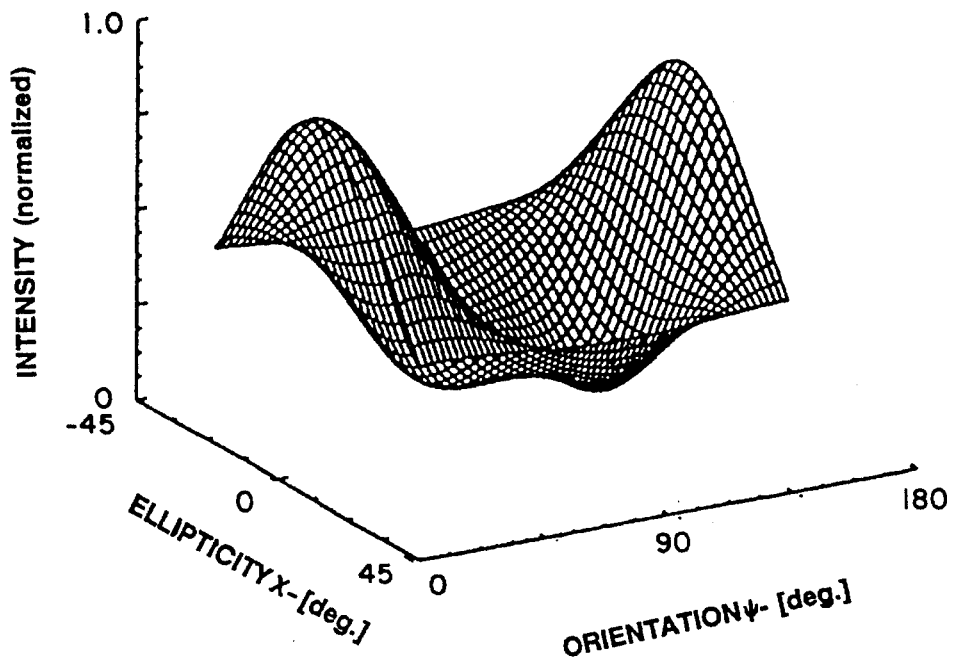
FIG. 14a shows a typical signature obtained for P-band backscatter in a forested part of a study area on flat terrain.
Figure 14B:
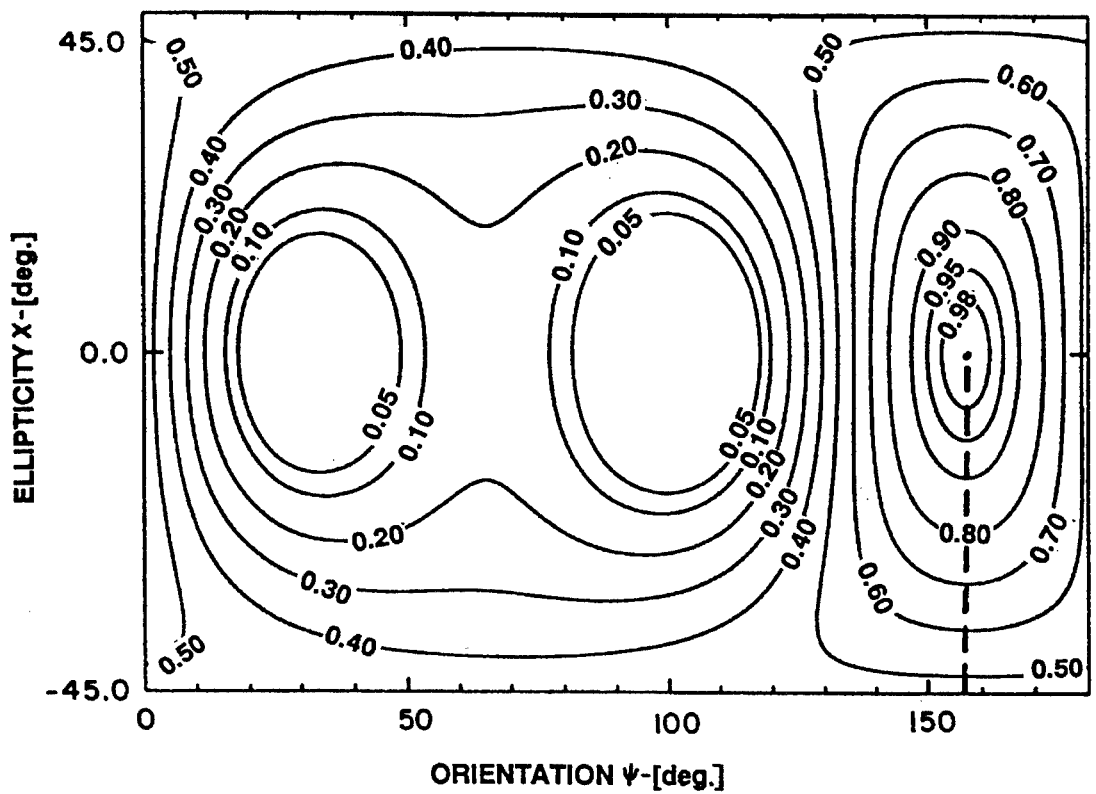
FIG. 14b shows the effect of a positive slope on the shape of a polarimetric signature.

The P-band signatures obtained throughout the Black Forest study area on both level and tilted terrain are characteristic of double-bounce scatters. These signatures show the aggregate effect at P-band of tree trunk-ground interactions, branch scattering, and direct-ground contributions. FIG. 14a shows a typical signature obtained for P-band backscatter in the forested part of a study area on flat terrain. The signature for flat terrain is characterized by major peaks at orientations, $\Psi$, of 0° and 180° (horizontal polarization), and a smaller peak at $\Psi=90°$ (vertical polarization). The flat-terrain signature is symmetric to either side of the orientation $\Psi=90°$. FIG. 14b shows the effect of a positive slope (height increasing from left to right in the azimuthal direction) on the shape of the polarimetric signature. The major effect of a known azimuthal slope of 22.5 is to move the position of the peak at 180 to 157 on the $\chi=0$ axis. This shift in the position of the polarization peak is proportional to the terrain slope in the azimuthal direction.

Polarimetric SAR measurements of terrain slopes in the Black Forest study up to ±25° have been measured and confirmed by comparison with the DEM. Operation at P-band, or at longer wavelength, offers a chance (depending on the biomass density and type for penetration through the forest canopy to map the underlying topography. For forests similar to the study area in the Black Forest penetration is likely for polarizations near the signature maxima.

This test confirmed that terrain slopes can be sensed for forested terrain at ground-level with an accuracy of 2° (moderate relief areas) to 3,2° at the Breg River valley and a correlation coefficient of greater than 0.80 when compared with DEM values. Terrain elevation profiles were derived from the primary slope measurements and have accuracies of 8.4 m (moderate relief areas) to 18 m in the Breg River valley with correlation coefficients of greater than 0.92. The technique allows sensing of topography for forested terrain having slopes up to at least ±25°. The measurement of topography at ground-level rather than forest canopy level has not been shown by any other remote sensing technique known today.

A second polarimetric SAR dataset was analyzed where the scattering is from mountainous desert terrain on the National Training Center near Ft. Irwin in southeastern California to establish that the polarimetric SAR technique would work when the terrain is open rather than forested. Because fully-polarimetric SAR imaging systems have, generally, been developed at L-band or higher frequencies, a second objective was to show that usable results are obtainable for open-terrain at L-band frequencies.

Figure 15:
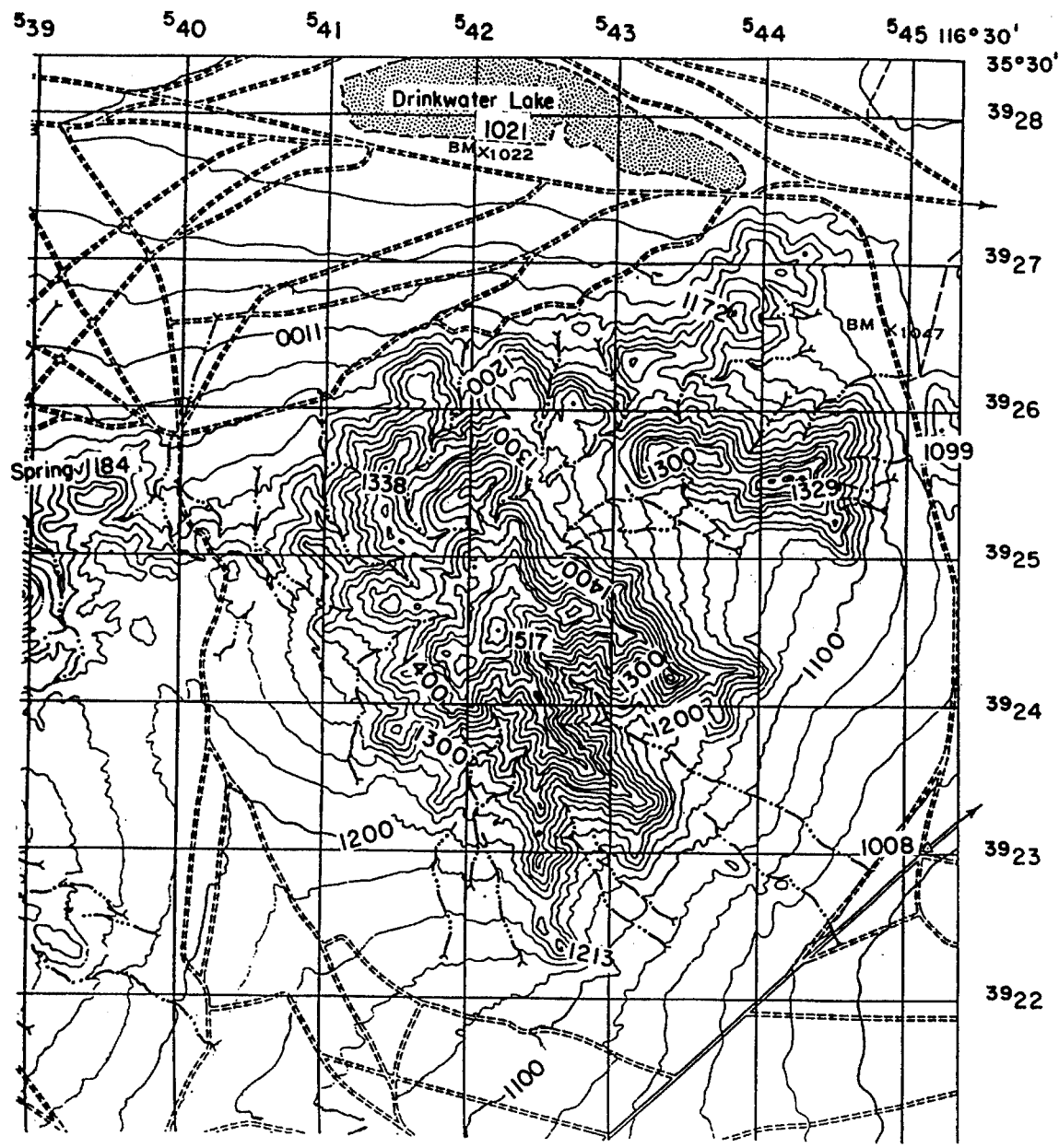
FIG. 15 shows the topography of the Fort Irwin study area from a Defense Mapping Agency 1:50,000 scale map with contours every 20 meters.

The data utilized was NASA JPL/AIRSAR data. Images produced from the dataset show a portion of the Tiefort mountain range, Drinkwater Lake, and the surrounding Mojave desert basins. In general the mountains in the image are rugged and devoid of trees and other large vegetation. Topographic slopes of up to ±50° and elevation differences of 487 m exist in the imaged area. FIG. 15 shows the topography of the Fort Irwin study area from a Defense Mapping Agency 1:50,000 scale map with contours every 20 meters. The valleys contain low desert vegetation types—but again, no forested areas.

Figure 16:
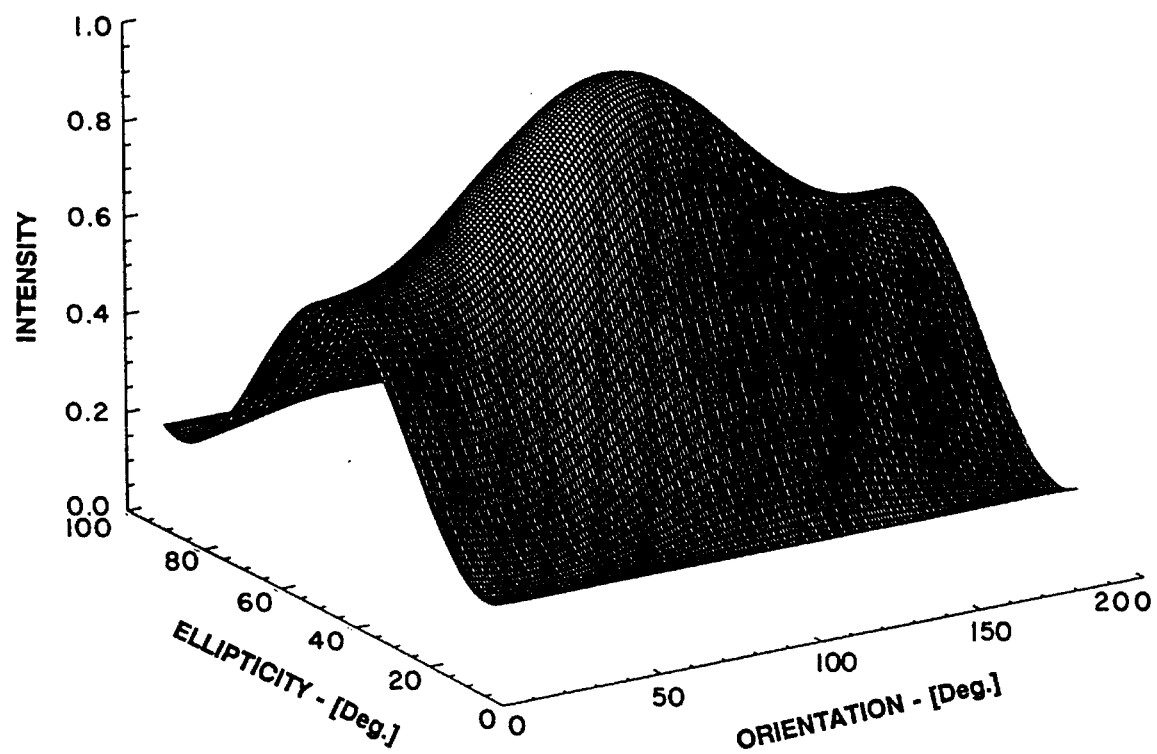
FIG. 16 shows an example of a typical Fort Irwin desert, open terrain, polarimetric signature at L-band.

This study area was selected because of the existence of a very accurate DEM covering an area of 5.6 km×7 km. This DEM is constructed on a 5 m post (pixel) spacing with an accuracy of 0.3 m. FIG. 16 is an example of a typical Fort Irwin desert, open terrain, polarimetric signature at L-band. Note that the signature maxima occurs now at about $\Psi=90°$ (VV-pol). Application of the foregoing computational technique to the Fort Irwin study area yielded slope/elevation profiles which correlated well with known mountain and desert basin features.

Figure 17A:
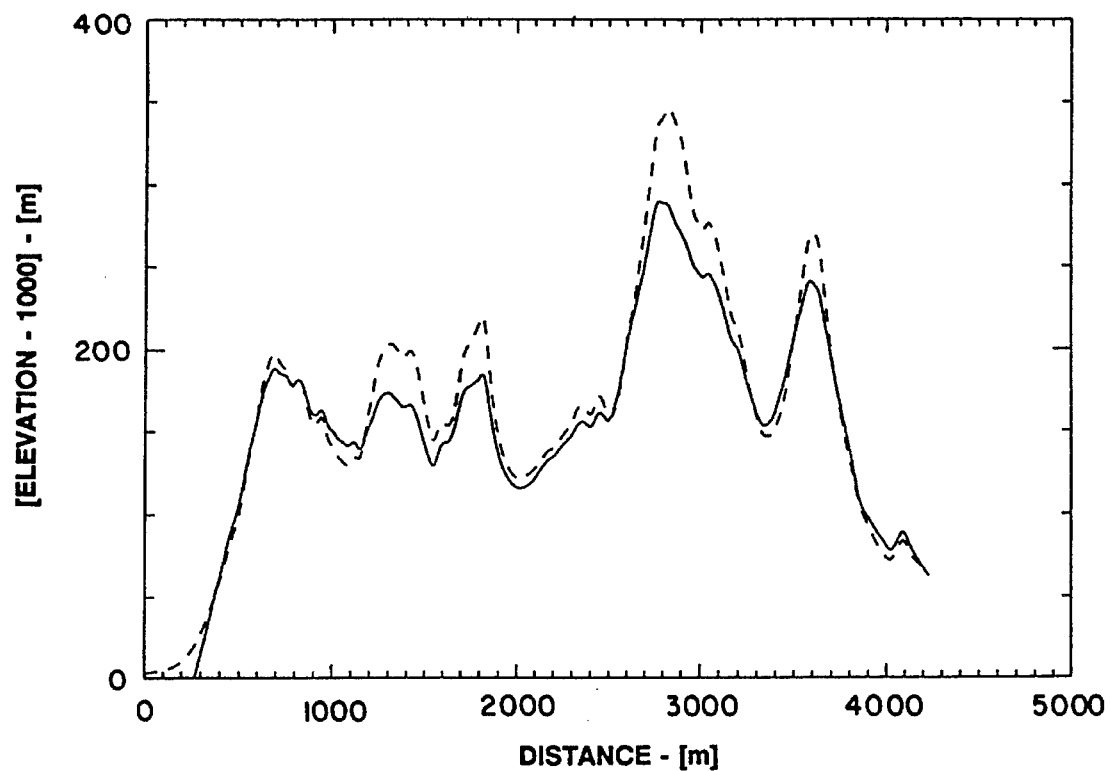
FIG. 17a shows a comparison of the Fort Irwin elevation profiles derived in the azimuthal direction from polarimetric SAR and DEM data near the central portion of the mountain shown in FIG. 15.
Figure 17B:
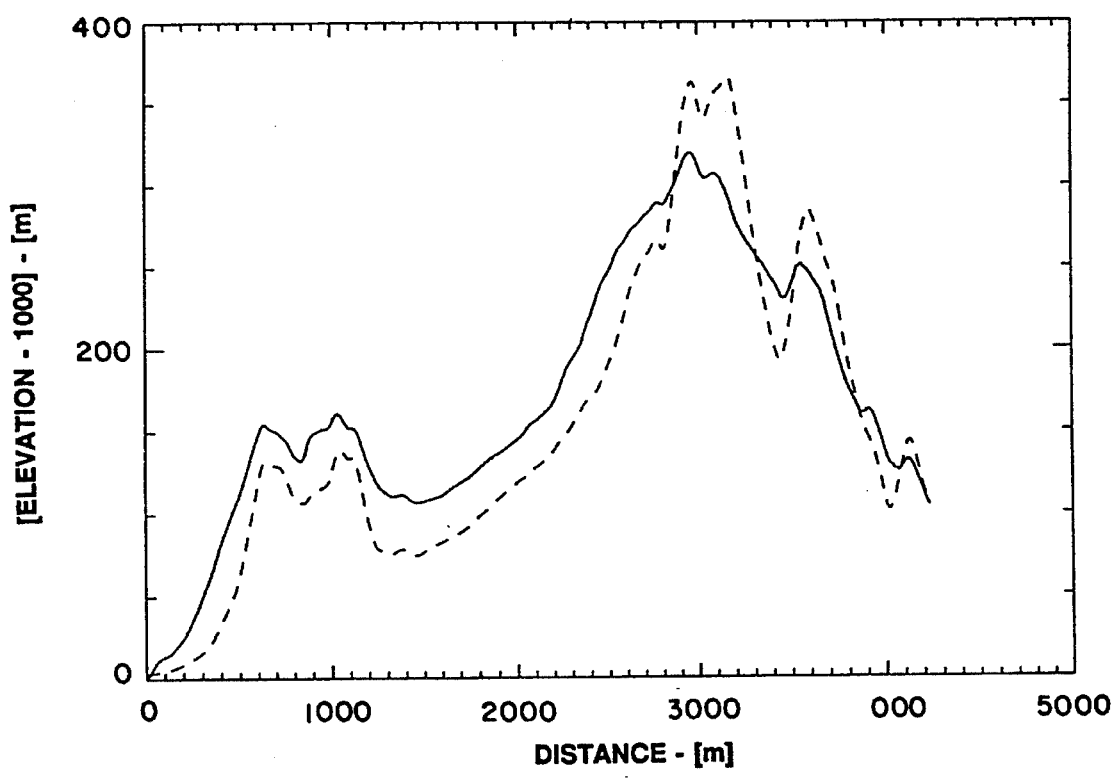
FIGS. 17b shows a comparison of the Fort Irwin elevation profiles derived in the azimuthal direction from polarimetric SAR data and DEM data near the central portion of the mountains shown in FIG. 15.

From the dataset, a rectification, or data co-registration, method suggested by Leberl (F. W. Leberl, *Radargrammetric Image Processing*, Artech House, Chapter 8, 1989) was applied instead which uses terrain features within the SAR image and the DEM. The SAR/DEM databases were rectified using localized mountain and desert basin sub-areas of the image. Multiple terrain features with approximately the same elevation were employed as tie-points. Terrain slope and elevation azimuthal profiles were then developed for these sub-areas. Two examples of elevation profiles derived near the central portion of the mountain are given in FIGS. 17*a* and *b* show a comparison of the Fort Irwin elevation profiles derived in the azimuthal direction from polarimetric SAR and DEM data near the central portion of the mountain shown in FIG. 16.

Figure 18:
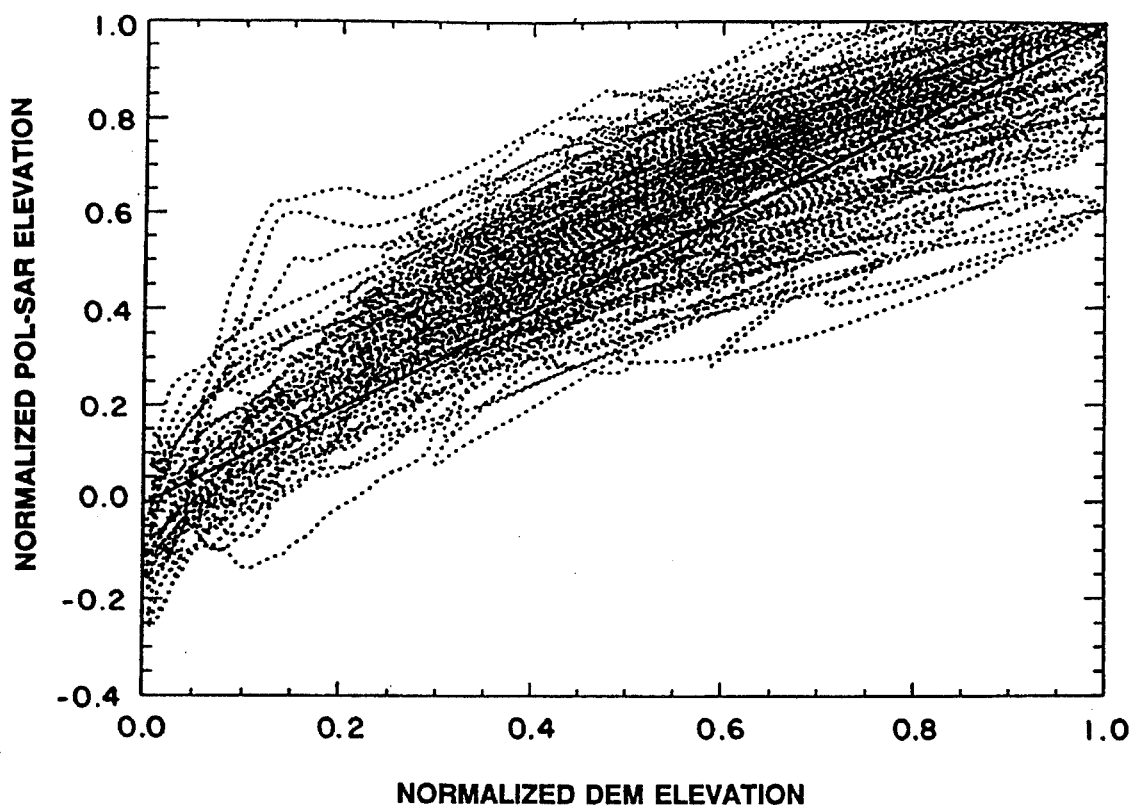
FIG. 18 shows a scatter plot for the Fort Irwin azimuthal profiles comparing DEM-derived angles with angles derived from polarimetric SAR data.

FIG. 18 shows a scatter plot for the Fort Irwin azimuthal profiles comparing DEM-derived angles with angles derived from polarimetric SAR data. In FIG. 18 the solid line indicates perfect agreement between the two elevation measurements. The azimuthal profiles in FIG. 18 consist of 44 profile having 50 m separation and are taken from the central 2 km (range) by 5 km (azimuth) portion of the mountain. The rms errors determined by comparing SAR and DEM measurements for these azimuthal profiles are also given in Table 1. The Fort Irwin study was made more difficult because of radar layover, shadowing and other effects in the rugged, mountainous terrain. The Fort Irwin rms errors shown in Table 1 are an initial estimate using a feature-based rectification technique.

Using the techniques described herein, polarimetric SAR systems using aircraft, space shuttle or satellite platforms are capable of providing topographic information over wide areas. The synthetic aperture radar is well known to those skilled in the art and preferably comprises an P-band (with a wavelength of approximately 68 cm), L-band (approximately 21 cm) or C-band (approximately 5.65 cm) having quad polarization or any combination of HH, VV, HV, VH, RC, LC polarizations and which is capable of penetrating vegetation, particularly tree foliage. This same SAR data is also useful in the accurate extraction of geophysical parameters (soil moisture, biomass density, crop type, etc.) when the underlying topography must be known and taken into account. Polarimetric SAR implemented at P-band, or lower frequencies, can be used as a measurement tool which can aid in solving the phase ambiguity problems found in interferometric SAR (IFSAR). Polarimetric SAR slope and elevation measurements can provide bounds on the IFSAR phase path.

Operation a P-band, or at longer wavelengths offers a chance (depending on the biomass density and type) for penetration through the forest canopy to map the underlying topography. (However, at C-band frequencies, the electromagnetic waves will not penetrate significantly into the forest, and the resulting scattering will be primarily from the branches and the needles.) The method for processing the polarimetric radar information adeptly handles transitions between spatial areas dominated by disparate scattering mechanisms—such as those occurring between forest areas and open fields.

Geophysical parameter extraction studies utilizing polarimetric SAR data are affected by local topography. The topographic measurement technique described herein provides co-registered estimates of local slopes which are used to improve the accuracy of such studies. A complete wide-area two-dimensional topographic slope and elevation map may be produced of open-terrain topography during day/night under all weather conditions.

The concepts of this invention, although preferably addressed to the polarimetric synthetic aperture radar (SAR) and usable with interferometric SAR, may also utilize polarimetric real aperture radar (RAR) systems. The only limitation placed on the use of RAR would be the size of the antenna required and its integration into an airborne carrier. In utilizing interferometric SAR the ability to achieve adequate spacing between antennas would be the most inhibiting limitation.

It will be understood by those skilled in the art that still other variations and modifications are possible and can be affected without detracting from the scope of the invention as defined by the claims.

APPENDIX I

```
;..........................................................
;        Program topo_sig2d_fast.pro
;..........................................................
;      Fast new version for general all-terrain scatter
;      Program computes orientation maximum in slices across the
         image
;      Program outputs a plot of orientation max(degs) vs distance
;      Program version for SGI/Sun-4
;      Incorporates new 2d search algorithm ( _fast version)
;..........................................................
;                    Dale Schuler 3/1/95
;..........................................................
;scaling and uncompressing raw data
;..........................................................
post = 0
scale = dblarr(255,275)        ;scaling data for compressed format
;
j=indgen(275)-137
temp=j/254.d0+1.5
temp2=j+137
for i=-127,127 do begin
    e = 2.0d0^double(i)
    scale(i+127,temp2) = temp*e
endfor
;..........................................................
openr,1,"/export/neptune2/schuler/san_francisco/SFWAVE.DAT"
     ; SAR image
;..........................................................
print,"Enter number of pixels/line in image (i-1024--1024?): "
read,npixs
print,"Enter number of lines in image (1-1280-1280?): "
read,nlines
buf=bytarr(10,npixs,nlines)
readu,1,buf
close,1
;..........................................................
     pix1=0L && pix2=0L  && line10=0L  && line 20=0L
     print,"Enter top of image initial profile strip corners "
     print,"Enter top left pixel,linei (0,10?): "
     read,pix1,line10
     print,"Enter bottom right pixel,linei (1023,27?): "
     read,pix2,line20
;..........................................................
; nl is the number of azimuthal image profiles
;..........................................................
```

```
        nl=5
        print,"Number of azimuthal image profiles (125? 5 for fast
           tests):'
        read,nl
 5      axx=systime(1)                        ; print time
        print,'system time=',axx
;.................................................................
;constants
        pixlen  =pix2-pix1+1
10      a  = intarr(10,pixlem)     ;compressed stokes matrix
        s  = fltarr(10,pixlen)     ;uncompressed stokes matrix
           elements
        linelen-1 is the width of the averaged strip
        linelen = line20-line10 + 1
15      pi = float(!pi)
        pi90 = 2.0*pi/180.0
        pi180=     pi/180.0
;.................................................................
;arrays
20      z       = fltarr(pixlen,nl)
        zo      = z
        said    = z
        chid    = z
        temp0   = fltarr(pixlen)
25      zoo     = z
        zinit   = z
        ms      = fltarr(4,4,pixlen)
        msavg   = ms
        msmax   = fltarr(pixlen)
30      said    = z
        chid    = z
        sig     = fltarr(181)
        st      = fltarr(4)
        sr      = fltarr(4)
35      stokes  = fltarr(4,4)
        temp    = fltarr(4,4)
;
        a00     = fltarr(pixlen)
        a01     = a00
40      a02     = a00
        a03     = a00
        a10     = a00
        a11     = a00
        a12     = a00
45      a13     = a00
        a20     = a00
        a21     = a00
        a22     = a00
        a23     = a00
```

```
        a30     = a00
        a31     = a00
        a32     = a00
        a33     = a00
;
;......................................................................
for n=0,nl-1 do begin         ;Profile strips formed (width linelen-
    1)
;......................................................................
    ms(*,*,*) = 0.0
    msavg(*,*,*) = 0.0
    a = 1L                    ; a*n equals spacing in lines
        between profiles.
    line1 = line10 +a* n
    line2 = line20 +a* n
;......................................................................
for i=line1,line2 do begin    ; line loop
;......................................................................
    ;for j=pix1,pix2 do begin ; Compute Stokes terms for pixs on
        1 line
    j=indgen(pix2-pix1+1)+pix1
;......................................................................
    a= fix(buf(*,j,i))
;......................................................................
    k=where(a gt 127)
    if k(0) ge 0 then a(k)=a(k)-256
;......................................................................
    sc = scale(a(0,*)+127,a(1,*)+137)
    scd127=sc/127.0 s(0,*) = 127 * sc                       ;m11
    s(1,*) = a(2,*)* sc                     ;m12
    s(2,*) = abs(a(3,*))*a(3,*)*scd127      ;m13
    s(3,*) = abs(a(4,*))*a(4,*)*scd127      ;m14
    s(5,*) = abs(a(5,*))*a(5,*)*scd127      ;m23
    s(6,*) = abs(a(6,*))*a(6,*)*scd127      ;m24
    s(7,*) = a(7,*)*sc                      ;m33
    s(8,*) = a(8,*)*sc                      ;m34
    s(9,*) = a(9,*)*sc                      ;m44
    s(4,*) = s(0,*)-s(7,*)-s(9,*)           ;m22

;......................................................................
; Stokes parameters put in [0-pixlen-1]
    jj=j-pix1
    a00(jj) = s(0,*)
    a01(jj) = s(1,*)
    a02(jj) = s(2,*)
    a03(jj) = s(3,*)
    a10(jj) = s(1,*)
```

```
        a11(jj) = s(4,*)
        a12(jj) = s(5,*)
        a13(jj) = s(6,*)
        a20(jj) = s(2,*)
        a21(jj) = s(5,*)
        a22(jj) = s(7,*)
        a23(jj) = s(8,*)
        a30(jj) = s(3,*)
        a31(jj) = s(6,*)
        a32(jj) = s(8,*)
        a33(jj) = s(9,*)
;
;endfor                                 ; end first pixel loop
;............................................................
;............................................................
;
; Smooth Stokes Matrix Parameters over 9 pixels (30 m)
;............................................................
        a00 = smooth(a00,9)
        a01 = smooth(a01,9)
        a02 = smooth(a02,9)
        a03 = smooth(a03,9)
        a10 = smooth(a10,9)
        a11 = smooth(a11,9)
        a12 = smooth(a12,9)
        a13 = smooth(a13,9)
        a20 = smooth(a20,9)
        a21 = smooth(a21,9)
        a22 = smooth(a22,9)
        a23 = smooth(a23,9)
        a30 = smooth(a30,9)
        a31 = smooth(a31,9)
        a32 = smooth(a32,9)
        a33 = smooth(a33,9)
;............................................................
;
; Stokes parameters (unaveraged) for each pixel
        ms(0,0,*) = a00
        ms(0,1,*) = a01
        ms(0,2,*) = a02
        ms(0,3,*) = a03
        ms(1,0,*) = a10
        ms(1,1,*) = a11
        ms(1,2,*) = a12
        ms(1,3,*) = a13
        ms(2,0,*) = a20
        ms(2,1,*) = a21
        ms(2,2,*) = a22
        ms(2,3,*) = a23
```

```
            ms(3,0,*) = a30
            ms(3,1,*) = a31
            ms(3,2,*) = a32
            ms(3,3,*) = a33
 5      ;
        ;..............................................................
        ; Average stokes parameters over nlines (vertical column)
        ;..............................................................
            msavg = ms + msavg
10          endfor                                  ; end line loop
        ;..............................................................
            msavg = msavg/linelen
        ;
        ;..............................................................
15      for jpix = 0,pixlen-1 do begin
        ;..............................................................
        ; New m_sigt2d.pro algorithm
        ;
        ;..............................................................
20      ; test program for find max point in pol. signature
        ; msavg values are only input parameter
        ; enter delta value
        delta = 30./msavg(1,1,jpix)
        ;ma=fltarr(2)
25      mm=fltarr(2,2)
        ma     =msavg(0,1:2,jpix)
        mm(*,0)=msavg(1,1:2,jpix)
        mm(*,1)=msavg(2,1:2,jpix)

30      ; test program for find max point in linear pol. signature
        ; delta value
        ; initial guess
        aa=[-1.,0.]
        norm_aa=aa/sqrt(total(aa*aa))
35      ; for n iterations
        for iii=1,40 do begin
           grad=ma+norm_aa#mm
           aa=norm_aa+delta*grad
        norm_old=norm_aa
40      norm_aa=aa/sqrt(total(aa*aa))
        incrs=abs(norm_old-norm_aa)
        if (max(incrs) lt 0.0001) then goto,fin1
          endfor
        fin1:
45         power1=msavg(1,1,jpix)+2.*total(ma*norm_aa)+norm_aa#mm#norm_aa
           norm_aa1=norm_aa
        ;..............................................................
        ; Skip seond initial guess if skip = 1
        ;..............................................................
```

```
         skip = 2
         if (skip ne 1) then begin
           ;..................................................
           ; second search from different initial guess
 5         ; initial guess
           aa=[1.,0.]
           norm_aa=aa/sqrt(total(aa*aa))
           ; for n iterations
           for ii=1,40 do begin
10           grad=ma+norm_aa#mm
             aa=norm_aa+delta*grad
             norm_old=norm_aa
             norm_aa=aa/sqrt(total(aa*aa))
             incrs=abs(norm_old-norm_aa)
15           if (max(incrs) lt 0.0001) then goto,finish)
           endfor
           finish:
           power2=msavg(1,1,jpix)+2.*total(ma*norm_aa)+norm_aa#mm#norm_aa
           ;print,'power1=',power1
20         ;print,'power2=',power2
           ;print, norm_aa1
           ;print, norm_aa
           bb1=power1(0)
           bb2=power2(0)
25           if (bb1 gt bb2) then begin
               norm_aa=norm_aa1
               power2=power1
             endif
             ; print,'ITERATION= ',i
30           ; print,'normalized aa=',norm_aa ;..................................................
         endif
         ;..................................................
35         sai2=atan(norm_aa(1),norm_aa(0))

sai2d=sai2*180 /3.14159
           if(norm_aa(1) lt 0.0) then sai2d=sai2d+360.

40       ; print.'    orientation=',said
           said(jpix,n)=sai2d/2
         ;..................................................
         ; Logic Rules for Bragg/Forest scatter
         ;..................................................
45       if (said(jpix,n) ge 110) then said(jpix,n) = said(jpix,n) - 180
         if (said(jpix,n) ge 70) and (said(jpix,n) lt 110) then $
             said(jpix,n) = said(jpix,n) - 90
         ;..................................................
```

```
endfor    ;end second pixel loop
;..............................................................
;
; Processing of slope profiles
;..............................................................
z(*,n) = smooth(said(*,n),9)
z(*,n) = z(*,n) - total(z(*,n))/pixlen
;..............................................................
;..............................................................
;
endfor    ;end n loop for profiles ; Compute elevation profile from slope values
;..............................................................
; insert az resolution for data, azres
azres = 8.27
zo = (tan(pi180*z))*azres
;.......................................
for isum = pix1+1,pix2 do begin
zoo(isum-pix1,*) = zoo(isum-(pix1+1),*) + zo(isum-pix1,*)
endfor ;..............................................................
;slope profiles z(pixlen,nl) written to file
openw,5,"polar_slope.dat"
writeu,5,z
close,5
;..............................................................
; Elevation profiles zoo(pixlen,nl) initialized and written to
  file
;..............................................................
;zinit(*,n) = 0.0
;zoo(*,n) = zoo(*,n) + zinit(*,n)
openw,6,"polar_el.dat"
wrireu,6,zoo
close,6
bxx=systime(2)
print,'system time=',bxx
cxx=bxx-axx
print,"Program Run Time = ",cxx
end
```

TABLE 1

Summary of Technique Performance

| Study | Moderate Terrain Slopes RMS Error | High Terrain Slopes RMS Error | Moderate Terrain Elevation Changes RMS Error | High Terrain Elevation Changes RMS Error | All Terrain Slopes Correlation Coefficient | All Terrain Elevation Changes Correlation Coefficien |
|---|---|---|---|---|---|---|
| Black Forest Study | 2.0° | 3.2° | 8.4 m | 18 m | 0.80 | 0.92 |
| Fort Irwin Study | 2.4° | 3.5° | 5.6 m | 23.5 m | 0.85 | 0.88 |

What is claimed is:

1. A polarimetric processor for measuring azimuth direction terrain slopes comprised of:

a radar for transmitting and receiving analog electromagnetic signals of alternately horizontally and vertically polarization;

an analog-to-digital converter where the analog electromagnetic signals are converted into a digital data bit stream;

a formatter for formatting the digital bit stream;

means for recording and storing the digital data bit stream;

a playback unit for removing the digital data from the storage means;

a digital correlator for correlating the digital data bit stream;

a computer for receiving the correlated digital data bit stream and computing
 (a) a Stokes-Mueller matrix, M, utilizing the digitized analog electromagnetic signals of alternately horizontally and vertically polarization extracted from the playback unit and correlated;
 (b) a polarimetric signature, $\sigma$ ($\Psi$ $\chi$), utilizing the Stokes-Mueller matrix, M;
 (b) a first, $a=a'=[-1,0,0]$, and second initial value, $a'=[1,0,0]$, for a pixel or pixels;
 (c) a first gradient utilizing the method of steepest descent for the first and second initial values;
 (d) updating the first and second initial values utilizing the gradient;
 (e) normalizing the first and second initial values;
 (f) repeat steps (c)–(e) utilizing the normalized first and second values until the maximum has been found;
 (g) $\sigma_1$ and $\sigma_2$ utilizing a new first and second values;
 (h) a comparison of $\sigma_1$ and $\sigma_2$,
 (i) a value for Ellipticity, $\chi=\sin^{-1}(a_3)/2$, and Orientation, $\Psi=\tan^{-1}(a_2/a_1)/2$;
 (j) a combination of individual pixel maximum locations;
 (k) a initialization of elevations for each row of azimuthal pixels by a known elevation point;
 (l) an integration of slope values in an azimuthal direction; and means for plotting the ellipticity and orientation to produce a presentation that is a direct measure of terrain azimuthal slopes and a derived estimate of terrain elevation.

2. A polarimetric processor, as in claim 1, wherein said radar is polarimetric synthetic aperture radar system.

3. A polarimetric processor, as in claim 1, wherein said radar is interferometric synthetic aperture radar system.

4. A polarimetric processor, as in claim 1, wherein said radar is polarimetric real aperture radar system.

5. A method for measuring azimuth direction terrain slopes comprised of:

transmitting and receiving analog electromagnetic signals of alternately horizontally and vertically polarization;

converting the analog electromagnetic signals into a digital data bit stream;

formatting the digital bit stream;

recording and storing the digital data bit stream;

removing the digital data from storage;

correlating the digital data bit stream;

computing
 (a) a Stokes-Mueller matrix, M, utilizing the digitized analog electromagnetic signals of alternately horizontally and vertically polarization extracted from the playback unit and correlated;
 (b) a polarimetric signature, $\sigma$ ($\Psi$ $\chi$), utilizing the Stokes-Mueller matrix, M;
 (b) a first, $a=a'=[-1,0,0]$, and second initial value, $a'=[1,0,0]$, for a pixel or pixels;
 (c) a first gradient utilizing the method of steepest descent for the first and second initial values;
 (d) updating the first and second initial values utilizing the gradient;
 (e) normalizing the first and second initial values;
 (f) repeat steps (c)–(e) utilizing the normalized first and second values until the maximum has been found;
 (g) $\sigma_1$ and $\sigma_2$ utilizing a new first and second values;
 (h) a comparison of $\sigma_1$ and $\sigma_2$,
 (i) a value for Ellipticity, $\chi=\sin^{-1}(a_3)/2$, and Orientation, $\Psi=\tan^{-1}(a_2/a_1)/2$;
 (j) a combination of individual pixel maximum locations;
 (k) a initialization of elevations for each row of azimuthal pixels by a known elevation point;
 (l) an integration of slope values in an azimuthal direction; and plotting the ellipticity and orientation to produce a presentation that is a direct measure of terrain azimuthal slopes and a derived estimate of terrain elevation.

* * * * *